US008929469B2

(12) United States Patent
Nakazawa

(10) Patent No.: US 8,929,469 B2
(45) Date of Patent: Jan. 6, 2015

(54) SIGNAL PROCESSING-SYSTEM USING SINGULARITY, AND ITS INFORMATION MEMORY MEDIUM

(75) Inventor: Isao Nakazawa, Machida (JP)

(73) Assignee: Communication and Broadcasting International Laboratory Co., Ltd., Tokyo (JP)

( * ) Notice: Subject to any disclaimer, the term of this patent is extended or adjusted under 35 U.S.C. 154(b) by 697 days.

(21) Appl. No.: 12/920,044

(22) PCT Filed: Feb. 27, 2009

(86) PCT No.: PCT/JP2009/054241
§ 371 (c)(1),
(2), (4) Date: Nov. 24, 2010

(87) PCT Pub. No.: WO2009/107879
PCT Pub. Date: Sep. 3, 2009

(65) Prior Publication Data

US 2011/0057689 A1 Mar. 10, 2011

(30) Foreign Application Priority Data

Feb. 28, 2008 (JP) ................................ 2008-081898

(51) Int. Cl.
*H04L 27/00* (2006.01)
*G10L 21/0208* (2013.01)
*G10L 19/26* (2013.01)
*G10L 21/0272* (2013.01)

(52) U.S. Cl.
CPC ........... *G10L 21/0208* (2013.01); *G10L 19/265* (2013.01); *G10L 21/0272* (2013.01)
USPC .......................................................... 375/259

(58) Field of Classification Search
USPC ........................................ 375/259, 260, 316
See application file for complete search history.

(56) References Cited

U.S. PATENT DOCUMENTS 5,835,237 A * 11/1998 Ebrahimi ...................... 358/448

FOREIGN PATENT DOCUMENTS

JP 4-315321 A 11/1992
JP 6-26298 B2 4/1994

(Continued)

OTHER PUBLICATIONS

International Search Report from PCT/JP2009/054241, issued Jun. 9, 2009.

(Continued)

*Primary Examiner* — Kevin M Burd
(74) *Attorney, Agent, or Firm* — Stroock & Stroock & Lavan LLP

(57) ABSTRACT

The signal processing-system using singularity is provided which is excellent in determination of the original signal against the degradation environment of an operating condition and robust to the signal degradation of noise, can generate the signal suitable to regeneration of the original signal, and has regeneration means to regenerate the original signal, wherein the system comprises: an original signal converter of the signal processing-system which converts the original signal contained in the inputted signal into the signal containing singular points by using the specific function, the converter outputting the signal containing singular points; an original signal regenerator which converts the incoming signals containing singular points into signals having singular points by the specific signal processing, the regenerator extracting the undesired-signal component from the signals having singular points; and a regenerator which regenerates the original signal by carrying out the operation of the generated undesired-signal and the above-mentioned signal-containing-singular-points, and outputs the regenerated signal.

19 Claims, 9 Drawing Sheets

(56) References Cited

FOREIGN PATENT DOCUMENTS

Figure 12:
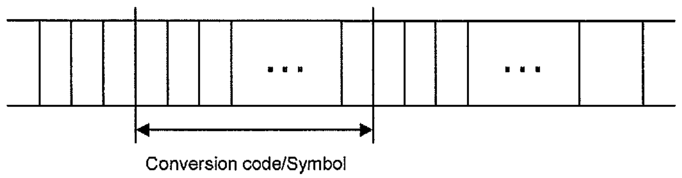

| | | | |
|---|---|---|---|
| JP | 2005-323384 | A | 11/2005 |
| JP | 2006-005918 | A | 1/2006 |
| WO | 2006101159 | A1 | 9/2006 |

OTHER PUBLICATIONS

Written Opinion of the International Search Authority from PCT/JP2009/054241, issued Jun. 9, 2009.

International Preliminary Report on Patentability from PCT/JP2009/054241, issued Oct. 12, 2010.

* cited by examiner

Figure 1-A
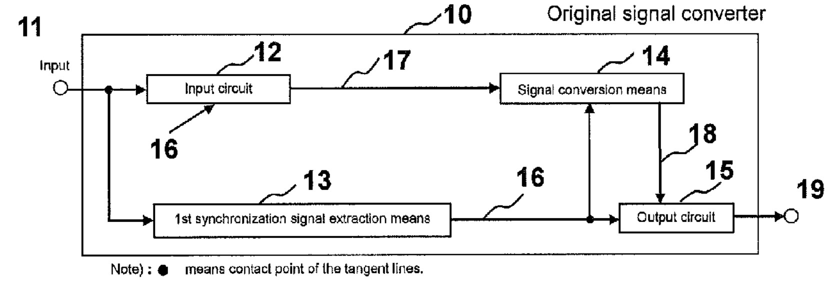
Figure 1-B
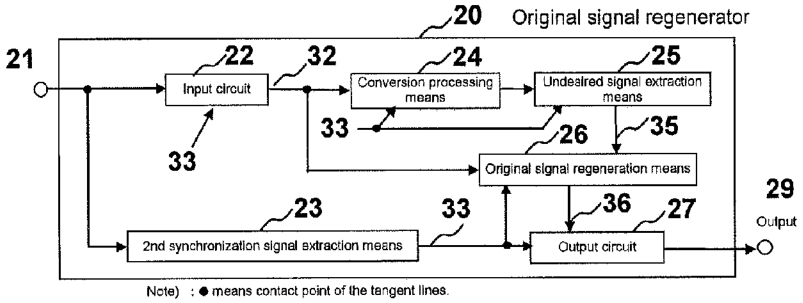
Figure 2
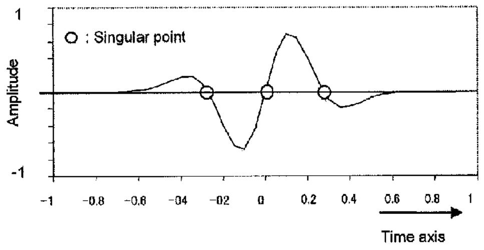
Figure 3
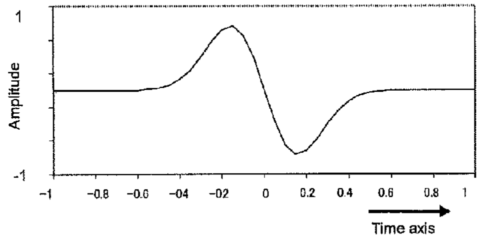
Figure 4
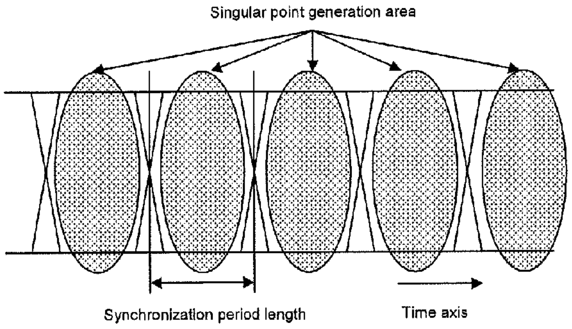

Figure 5
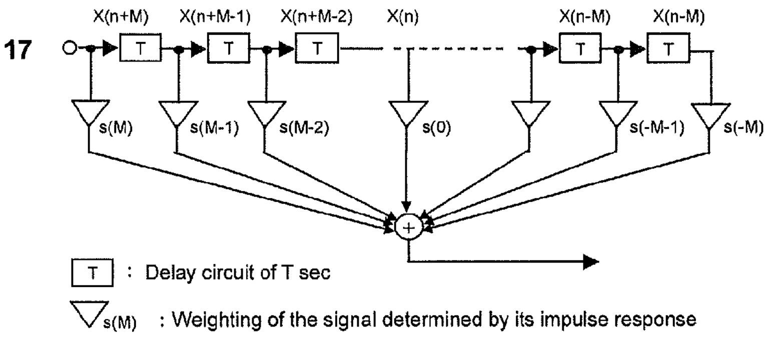
Figure 6-A
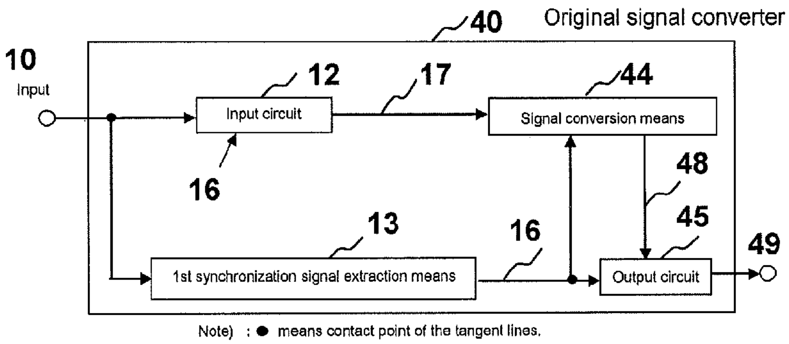
Figure 6-B
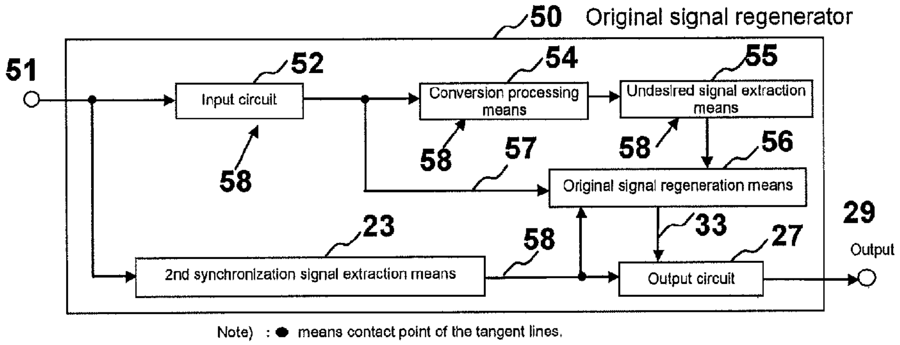
Figure 7
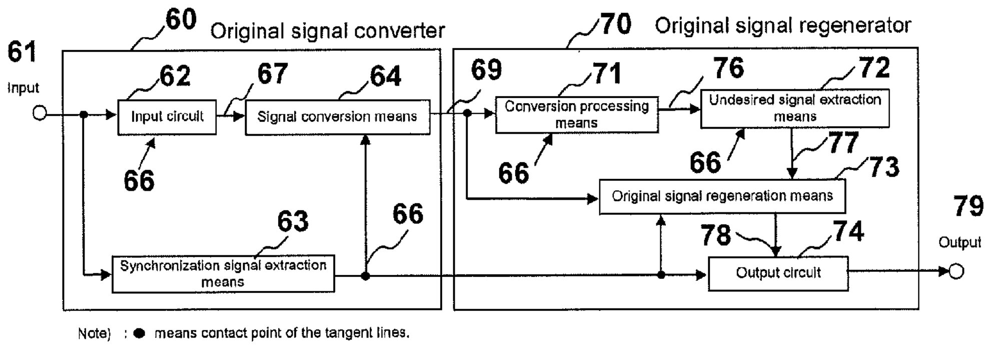

Figure 8
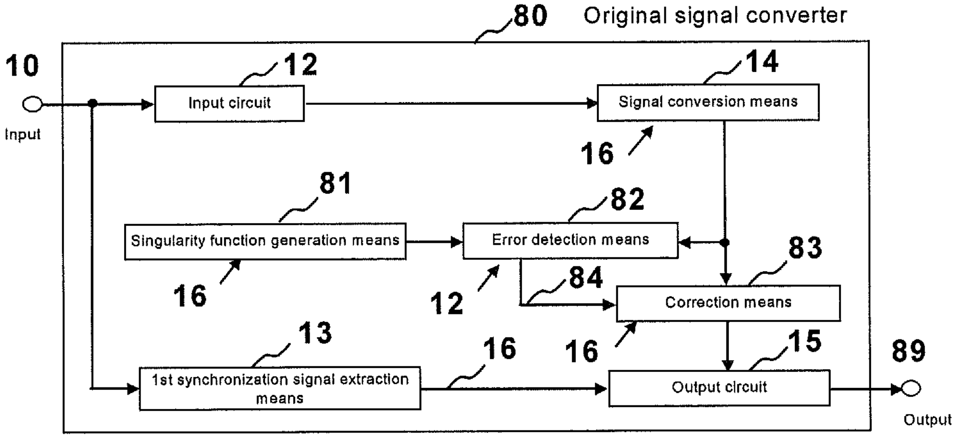
Note) : ● means contact point of the tangent lines.
Figure 9-A
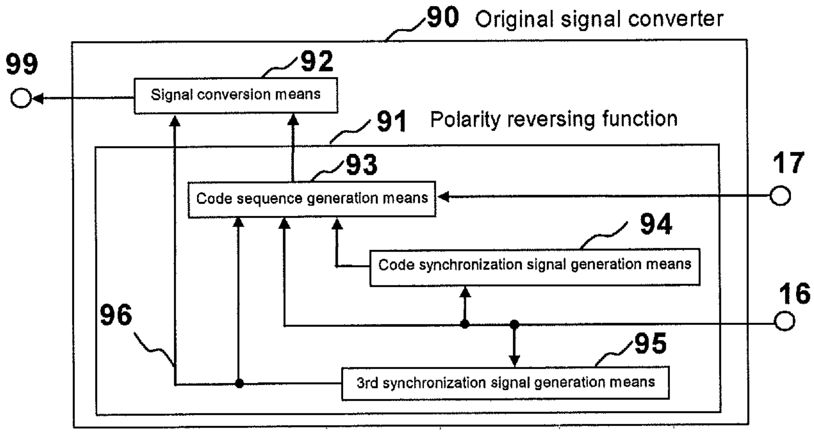
Note) : ● means contact point of the tangent lines.
Figure 9-B
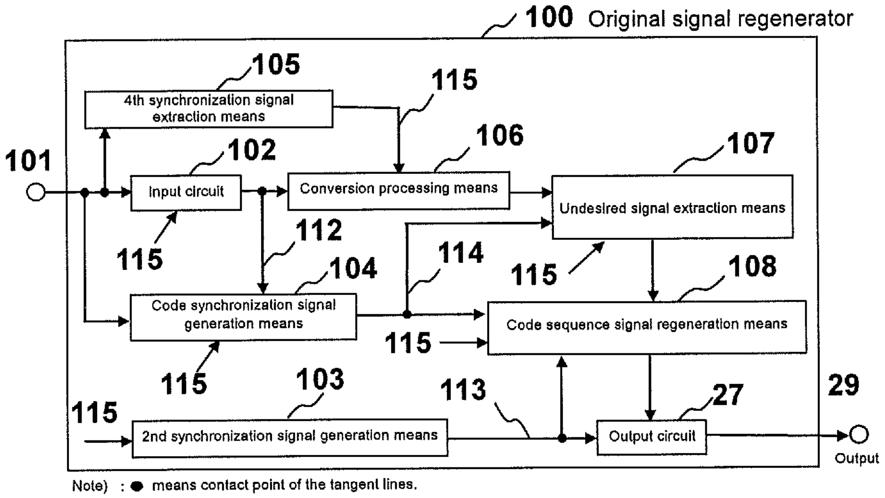
Note) : ● means contact point of the tangent lines.

Figure 10
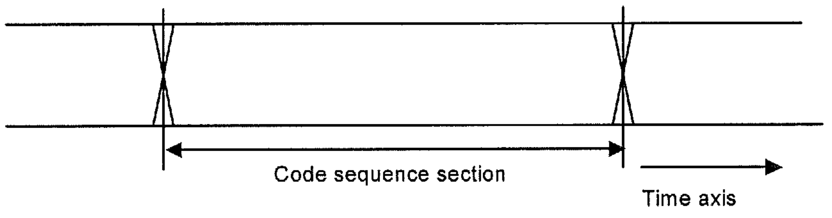
Figure 11-A
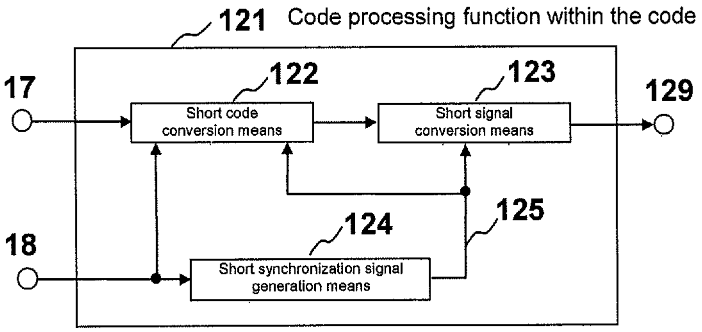
Note) : ● means contact point of the tangent lines.
Figure 11-B
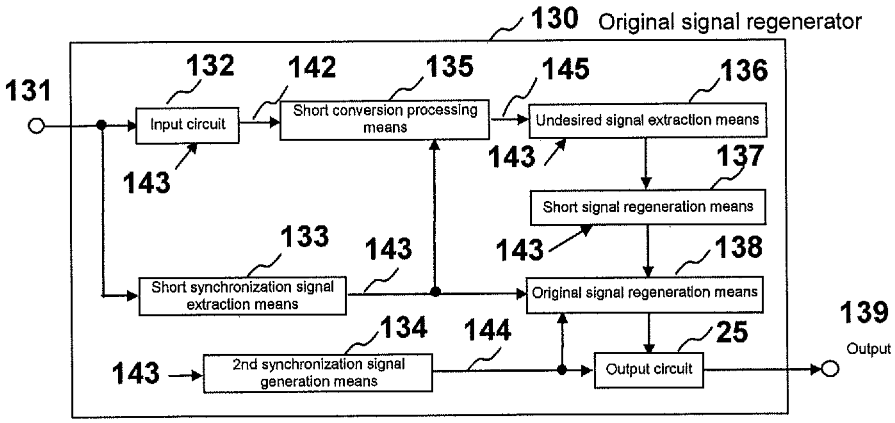
Note) : ● means contact point of the tangent lines.

Figure 17
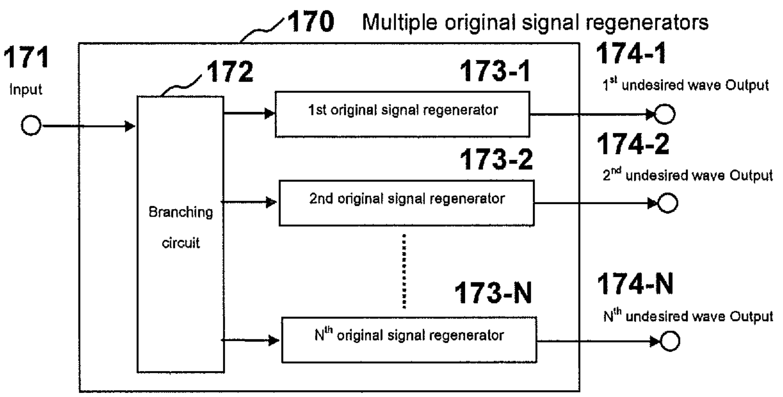
Figure 18
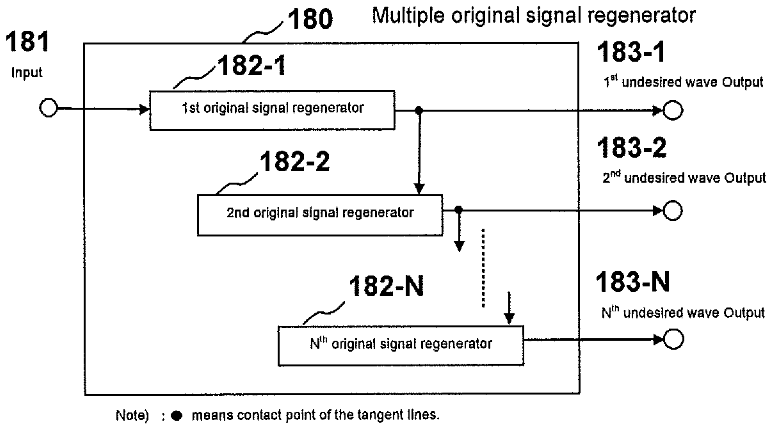
Figure 19-A
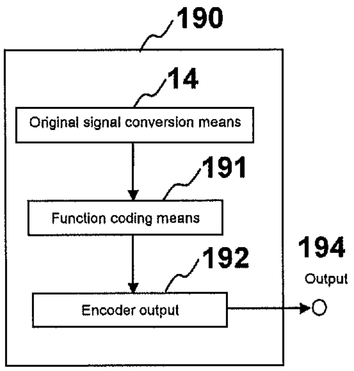
Figure 19-B
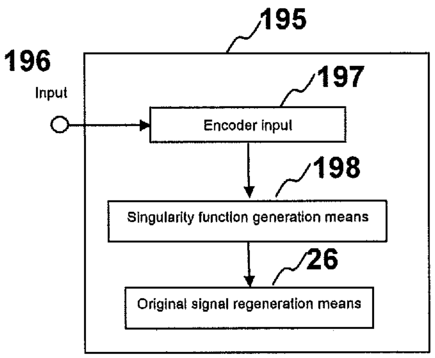
Figure 20
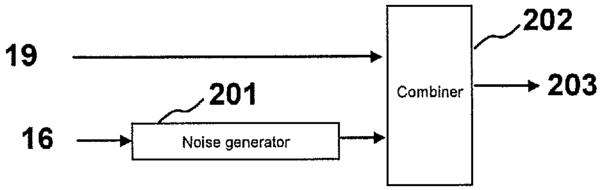

Figure 21-A
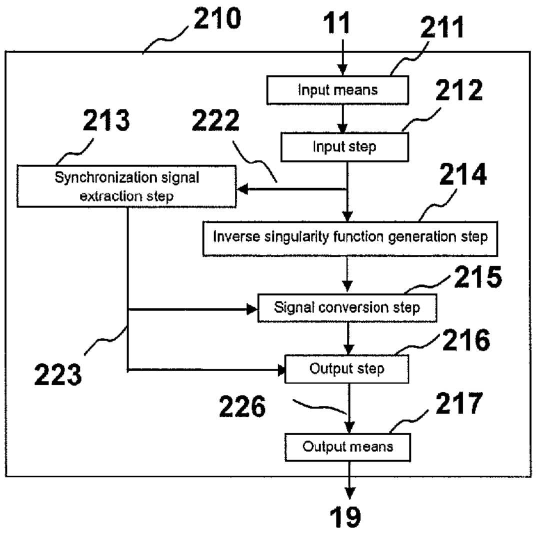
Figure 21-B
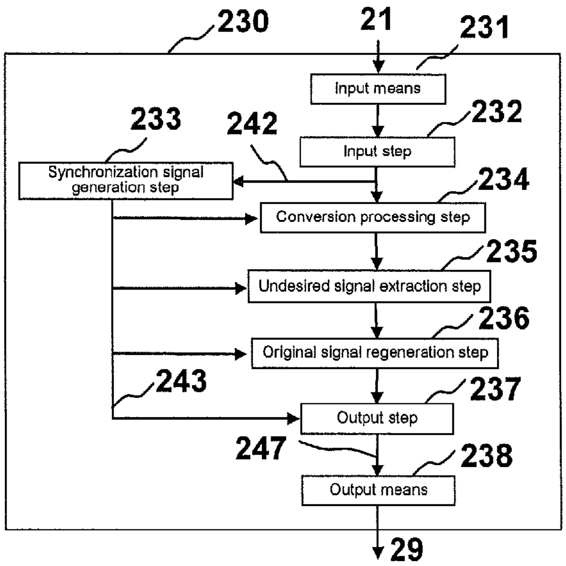
Figure 22
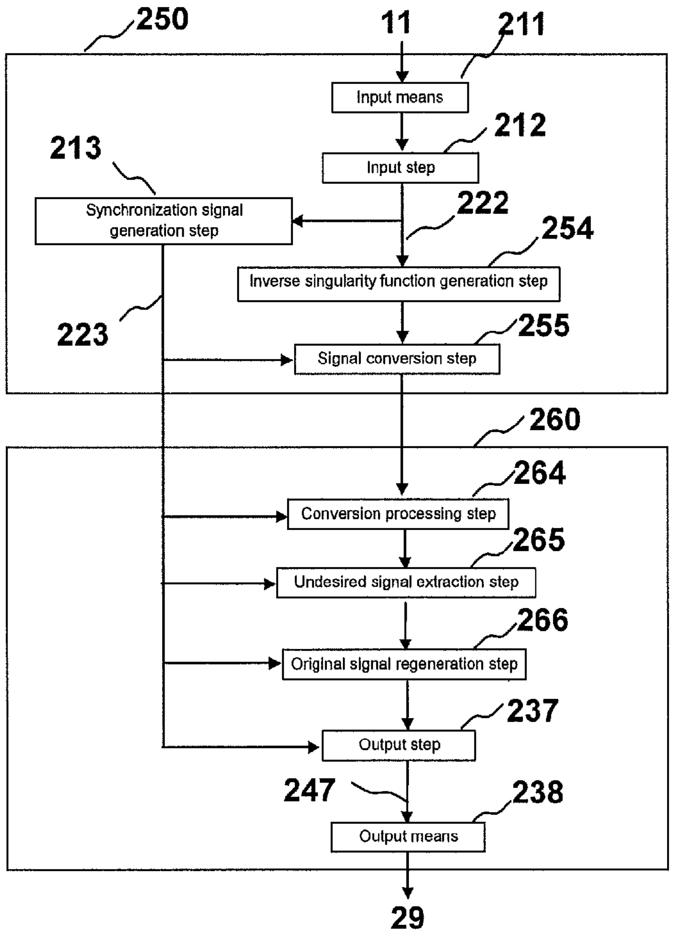

Figure 23-A
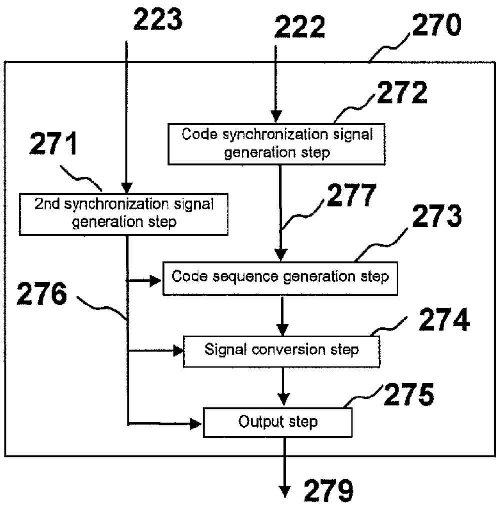
Figure 23-B
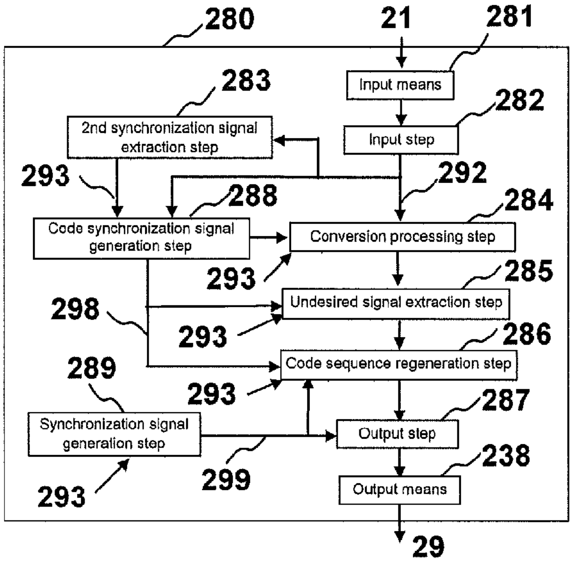
Figure 24-A
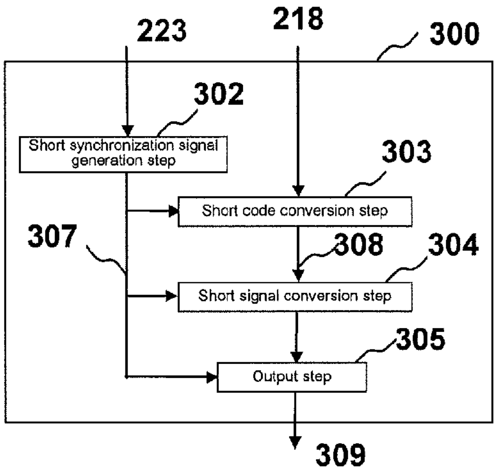
Figure 24-B
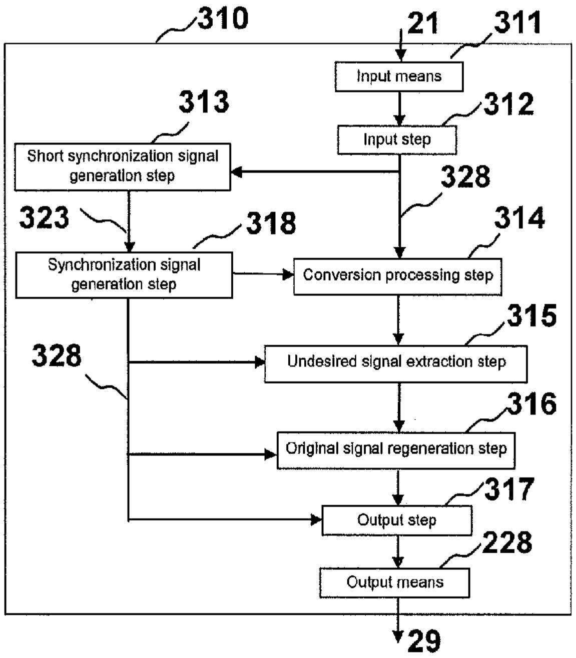

Figure 25-A
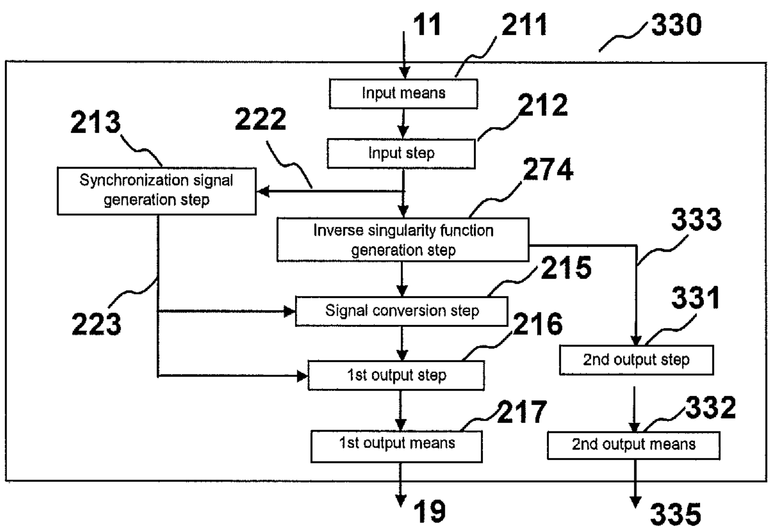
Figure 25-B
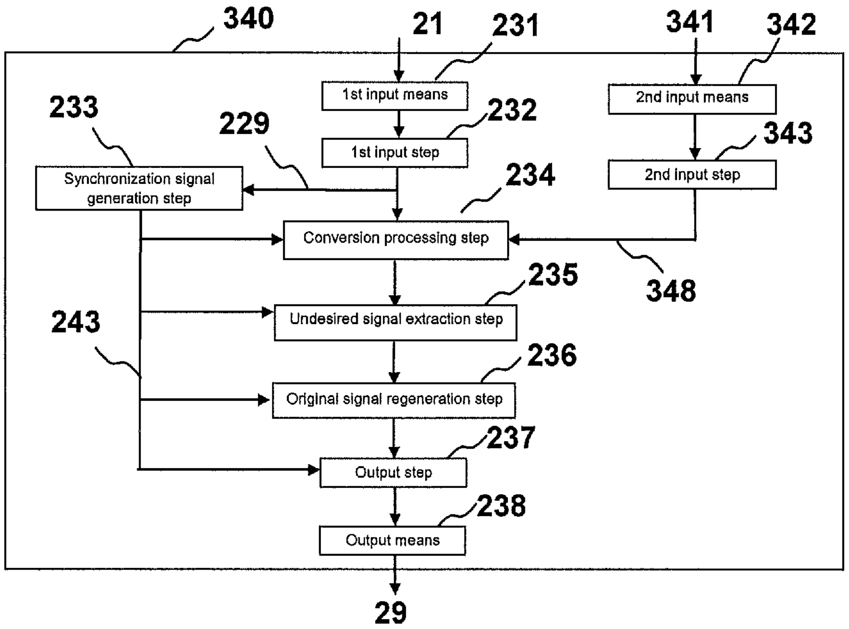
Figure 26
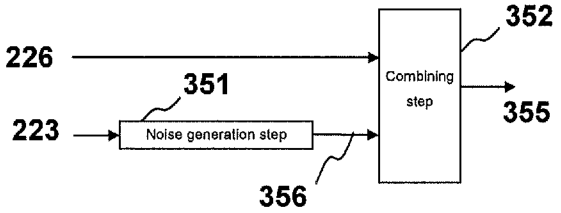

SIGNAL PROCESSING-SYSTEM USING SINGULARITY, AND ITS INFORMATION MEMORY MEDIUM

CROSS-REFERENCE TO RELATED APPLICATIONS

This application is a national phase application under 35 U.S.C. §371 of PCT Application No. PCT/JP2009/001520, filed Mar. 31, 2009, which claims the benefit of Japanese Patent Application No. 2008-095466, filed Apr. 1, 2008, and Japanese Patent Application No. 2008-100894, filed Apr. 8, 2008 and Japanese Patent Application No. 2008-100889, filed Apr. 8, 2008 and Japanese Patent Application No. 2008-186588, filed Jul. 17, 2008 and Japanese Patent Application No. 2009-080676, filed Mar. 27, 2009, the entire content of which are expressly incorporated herein by reference thereto.

BACKGROUND OF THE INVENTION

Field of the Invention

This invention relates to the signal processing-system using singularity and the associated information memory medium. The signal processing-system consists of the original signal converter and the original signal regenerator. The original signal converter consists of the signal conversion means, the undesired-signal extraction means, the input circuit, and the output circuit. The original signal regenerator consists of the conversion-processing means, the undesired-signal extraction means, the original signal regeneration means, the synchronization-signal extraction means, the input circuit, and the output circuit.

Especially, in the original signal converter, the inputted original signals are converted into the signals containing singular points for every synchronous cycle and the converted signals are outputted. In the original signal regenerator, the inputted signals containing singular points are converted into signals having singular points, the undesired wave component is regenerated by the signal processing for the singular points, and the original signals are regenerated by the operation using the signals having singular points.

This invention relates to the signal processing-system using singularity that can regenerate the original signals together with the advantage that is excellent in determination of the original signals against the degradation environment of the operating condition and robust to the signals degradation of noise etc.

Description of the Related Art Including Information Disclosed Under 37 CFR 1.97 and 1.98

Heretofore, the technology of extracting signals from the received wave buried in noise and/or undesired wave has been proposed. By such technology, the signals are estimated from the statistical character of the signal and noise or an undesired wave. For example, such statistical detection theory is described in the non-patenting reference 1. Moreover, there is WINNER filter that can minimize the second power average of the difference between the regenerated signals and the original signals. For example, these minimum-variance estimation methods are described in the non-patenting reference 2.

On the other hand, the interference elimination technology that can eliminate the interference such as echo interference that cannot be eliminated by receiving-filters although an out-band interference wave can be filtered by the receiving filter is also studied widely.

Non-patenting reference 1: J. Hancock, P. Wintz "SIGNAL DETECTION THEORY" McGraw-Hill, New-York 1966

Non-patenting reference 2: Katayama "APPLICATION OF KALMAN FILTER, NEW EDITION"

Asakura Publishing Co., Ltd., Tokyo January 2000

Non-patenting reference 3: Ueno, Sunada, Arai "PLEASURE OF MATHEMATICS (THE WORLD OF SINGULAR POINT)

Nippon Hyoron-Sha. Tokyo November 2005

DISCLOSURE OF THE INVENTION

Brief Summary of the Invention

Problems to be Solved by the Invention

However, the following problems had arisen in the statistical detection.

Since generally the optimal value of signal regeneration would not be acquired if the statistical detection method were not applied to the statistically stable condition, correct signal regeneration was difficult when statistical characteristic of the fluctuating signal and the statistical characteristic of the interference wave are unstable. Moreover, when many disturbance factors existed, that are a delay wave, an interference noise, an interference wave, etc., the statistical detection method of signals had been complicated, and the detection result had remained in the realm of speculation.

On the other hand, in order to identify the statistical characteristic, statistical processing time had to be lengthened, it caused more delay of the processing operation time and it had the fault of making processing more complicated.

Moreover, since in the signal processing which treats digital signals higher reliability was required for the regenerated signals, the more powerful system that could overcome against many degradation factors under the operation environment, such as a delay wave, interference noise, distortion caused by means performance, was demanded.

Means for Solving the Problems

This invention was made in order to solve the above-mentioned problems. This invention provides the signal-processing system that converts the original signals into the signals containing singular points and analyzes the singularity area. This signal processing means has many advantages as follows: it is excellent in identifying of the original signals against the degradation of the operating environment, it is strong against the signal degradation by noise etc., and it is suitable for regeneration of the original signal.

This provided system consists of the original signal converter, which converts the original signals into the signals containing singular points by the signal processing, and followings:

The signal conversion means, the synchronization signal extraction means, the input circuit, the output circuit, the original signal regenerator, the conversion processing means, the undesired signal extraction means, the original signal regeneration means, the synchronization signal extraction means, the input circuit, and the output circuit.

Another system configuration consists of:

The original signal conversion feature, the signal conversion step, the synchronization-signal extraction step, the input means, the output means, the original signal regeneration feature, the conversion processing step, the undesired signal extraction step, the original-signal regeneration step, the synchronization-signal extraction step, the input means, and the output means. Furthermore, this invention provides the information memory medium that recorded the associated program to realize these systems.

Here, the following points or states are called the singular points: If the information of the original signals has the minimal points (including zero) on the original signals but the signals except the original signals have information of the signals, after predetermined signal processing was applied to the signals having the original signals. (The same applies hereinafter.)

On mathematics, it is defined as a place with the different feature from the circumference. For example, descriptions can be seen in the non-patenting reference 3.

The signal before being converted that can be converted into the signal having singular points by the specific signal processing is called the signal containing singular points. (The same applies hereinafter.)

To convert the signal containing singular points into signal having singular points by the specific signal processing is called the specific signal processing. (The same applies hereinafter.)

To convert the signals having singular points into signals containing singular points by the specific signal processing is called the specific inverse signal processing. (The same applies hereinafter.)

When there are many places to process singular points and they compose singular points overall, each signal of which singular point was processed is called as the signal containing quasi-singular points. (The same applies hereinafter.)

When an original signal and the singular point are orthogonal to each other, it is called as the orthogonal singular point. (The same applies hereinafter.)

However, when distinction is not necessary, singular points, quasi-singular points, and orthogonal singular points are simply called signals containing singular points.

In addition, when original signals are converted into the short signals by coding with the short period, it is called the short singular point, short quasi-singular point, and short orthogonal singular point respectively in order to distinguish from singular point, quasi-singular point, and orthogonal singular point. (The same applies hereinafter.)

However, when distinction is not necessary, short singular points, short quasi-singular points, and short orthogonal singular points are called signals containing singular points. (The same applies hereinafter.)

The transfer function of signals having singular points is called specific singularity-function. (The same applies hereinafter.)

The transfer function of the signals containing singular points is called the specific inverse singularity function. (The same applies hereinafter.)

The operation that converts an inverse singularity function into a singularity-function is called singularity operation. (The same applies hereinafter.)

Conversely, the operation that converts a singularity-function into an inverse singularity function is called inverse singularity operations. (The same applies hereinafter.)

Signals except original signals, such as thermal noise, an interference wave, and distortion noise, are called undesired-signal. (The same applies hereinafter.)

Technical Advantages of the Invention

This invention can provide the means that is excellent in identification of original signals against the degradation environment of an operating condition, robust to the signal degradation from noise and distortion, and enables the regeneration of the original signals, through the following two functions:

The original signal converter converts the inputted original signals into the signals containing singular points for every synchronous cycle and outputs the signals having singular points.

The original signal regenerator converts the inputted signals containing singular points into the signals having singular points, regenerates the undesired wave component by signal processing at the singular points, and regenerates original signals through the operation of the signals having singular points.

BRIEF VIEWS OF THE SEVERAL VIEWS OF THE DRAWINGS

FIG. 1-A: Configuration diagram of the original signal converter that shows the $1^{st}$ example of the signal processing-system of this invention.

FIG. 1-B: Configuration diagram of the original signal regenerator that shows the $1^{st}$ example of the signal processing-system of this invention.

FIG. 2: An example of the specific singularity-function.

FIG. 3: An example of the specific inverse singularity-function.

FIG. 4: An example of the singular point generation area of a specific inverse singularity function.

FIG. 5: An example of block diagram of singular point conversion into signal domain.

FIG. 6-A: Configuration diagram of the original signal converter that shows the $2^{nd}$ example of the signal processing-system of this invention.

FIG. 6-B: Configuration diagram of the original signal regenerator that shows the $2^{nd}$ example of the signal processing-system of this invention.

FIG. 7: Configuration diagram of the $3^{rd}$ example of the signal processing-system of this invention.

FIG. 8: Configuration diagram of the original signal converter that shows the $4^{th}$ example of the signal processing-system of this invention.

FIG. 9-A: Configuration diagram of the original signal converter that shows the $5^{th}$ example of the signal processing-system of this invention.

FIG. 9-B: Configuration diagram of the original signal regenerator that shows the $5^{th}$ example of the signal processing-system of this invention.

FIG. 10: An example of the signal that has polarity reverse between code-sequence.

FIG. 11-A: Configuration diagram of the original signal converter that shows the $6^{th}$ example of the signal processing-system of this invention.

FIG. 11-B: Configuration diagram of the original signal regenerator that shows the $6^{th}$ example of the signal processing-system of this invention.

FIG. 12: An example of a short conversion signal.

Figure 13:
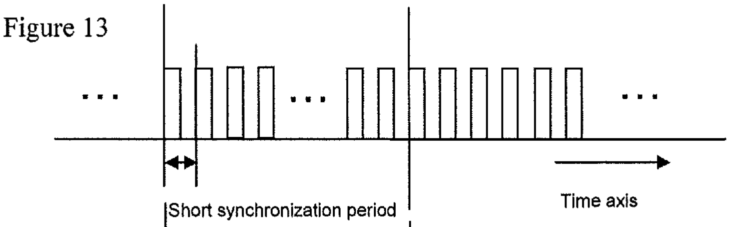

FIG. 13: An example of a short synchronization-signal of a short conversion signal.

Figure 14:
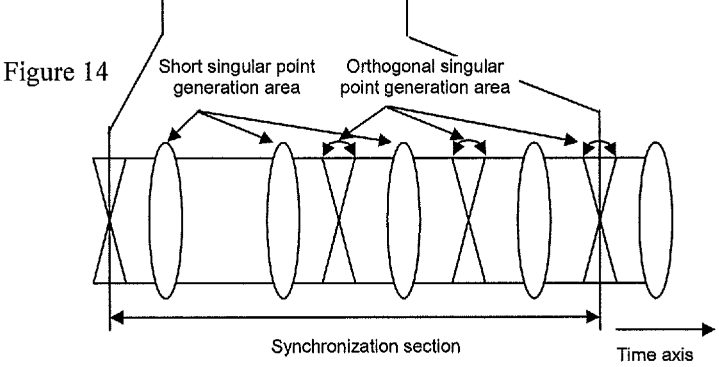

FIG. 14: An example of a short internal signal having singular points.

Figure 15:
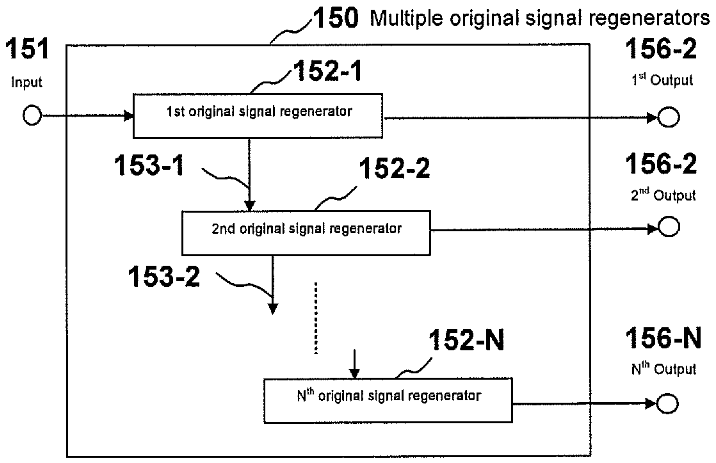

FIG. 15: Configuration diagram of the original signal regenerator that shows the $8^{th}$ example of the signal processing-system of this invention.

Figure 16:
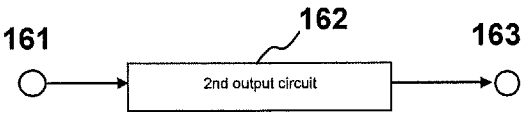

FIG. 16: Configuration diagram of the original signal regenerator that shows the $9^{th}$ example of the signal processing-system of this invention.

FIG. 17: Configuration diagram of the original signal regenerator that shows the $10^{th}$ example of the signal processing-system of this invention.

FIG. 18: Configuration diagram of the original signal regenerator that shows the $11^{th}$ example of the signal processing-system of this invention.

FIG. 19-A: Configuration diagram of the original signal conversion that shows the $12^{th}$ example of the signal processing-system of this invention.

FIG. 19-B: Configuration diagram of the original signal regenerator that shows the $12^{th}$ example of the signal processing-system of this invention.

FIG. 20: Configuration diagram of the original signal conversion that shows the $13^{th}$ example of the signal processing-system of this invention.

FIG. 21-A: Signal-processing step of the original signal converter that shows the $14^{th}$ and $15^{th}$ example of the signal-processing system of this invention.

FIG. 21-B: Signal-processing step of the original signal regenerator that shows the $14^{th}$ and $15^{th}$ example of the signal-processing system of this invention.

FIG. 22: Signal-processing step that shows the $16^{th}$ example of the signal processing-system of this invention.

FIG. 23-A: Signal-processing step of the original signal converter that shows the $17^{th}$ example of the signal-processing system of this invention.

FIG. 23-B: Signal-processing step of the original signal regenerator that shows the $17^{th}$ example of the signal-processing system of this invention.

FIG. 24-A: Signal-processing step of the original signal converter that shows the $18^{th}$ example of the signal processing-system of this invention.

FIG. 24-B: Signal-processing step of the original signal regenerator that shows the $18^{th}$ example of the signal processing-system of this invention.

FIG. 25-A: Signal-processing step of the original signal converter that shows the $19^{th}$ example of the signal processing-system of this invention.

FIG. 25-B: Signal-processing step of the original signal regenerator that shows the $19^{th}$ example of the signal processing-system of this invention.

FIG. 26: Signal-processing step of the noise addition that that shows the $20^{th}$ example of the signal processing-system of this invention.

DETAILED DESCRIPTION OF THE INVENTION

Best Mode for Carrying Out the Invention

In order to realize the above mention, the best modes for carrying out this invention are explained based on a drawing, along the principle of this invention. In attached drawings, the same numeral codes are assigned to the drawings that have the same function.

The best mode explained below is thing for explanation, and does not restrict the range of this invention. Therefore, although a person skilled in the art can adopt the embodiment that replaced each of these elements or all elements by the thing equivalent to this, such embodiments are also included in the range of this invention.

Although the synchronization-signal extraction means is used in the best mode explained below, the synchronization-signal also can be supplied as follows based on this, and it is contained in the range of this invention. (This method is not drawn in the FIG. 1.)

When an external synchronization-signal is inputted, the concerned synchronization-signal extraction means is replaced to a synchronization-signal distribution means. When synchronization information is not included in an input signal, a synchronization-signal is generated in an internal synchronization-signal.

Although in the explanation below, continuous digital signals are imaged as the input original signals, this invention is applicable also to all signal forms such as a discrete digital signal, an analog signal, a composite signal (a synchronization-signal is included), a code, etc., and all of them are contained in the range of this invention. (They are not drawn in the FIG. 1.)

Although in the explanation below, the signal processing-system performs on the time axis, this invention is applicable also to a signal processing-system operating on the frequency axis, and it is contained in the range of this invention. (This method is not drawn in the FIG. 1.)

In addition to the signal processing-system itself, the information record medium that records the specific signal processing, the signals containing specific singular points, the function and the data of singular points, and the program of this invention can be distributed and sold independently.

FIG. 1-A shows the configuration of the original signal converter 10 of the signal processing-system using singularity concerning to the $1^{st}$ viewpoint of this invention. The original signal converter consists of the conversion means 14, the $1^{st}$ synchronization-signal extraction means 13, the input circuit 12, and the output circuit 15.

FIG. 1-B shows the configuration of the original signal regenerator 20 of the signal processing-system using singularity concerning to the $1^{st}$ viewpoint of this invention. The original signal regenerator consists of the conversion-processing means 24, the undesired-signal extraction means 25, the original signal regeneration means 26, the $2^{nd}$ synchronization-signal extraction means 23, the Input circuit 22, and the output circuit 27.

In the original signal converter 10, the $1^{st}$ synchronization-signal 16 of the original signal is extracted from the signal containing the original signal by the $1^{st}$ synchronization-signal extraction means 13. The $1^{st}$ synchronization-signal 16 is sent to the input circuit 12, the signal conversion means 14, and output circuit 18.

Based on the extracted $1^{st}$ synchronization-signal 16, the signal 11 is converted into the internal signal 17 by the input circuit 12, and sent to the signal conversion means 14. Applying signal processing with the specific inverse singularity operation, the signal conversion means 14 converts the internal signal 17 into the signal containing singular points, and sends it to the output circuit 15. The output circuit 15 outputs the signals containing singular points 19.

In the original signal regenerator 20, the $2^{nd}$ synchronization-signal 33 is extracted from the input signal 21 containing singular points by the $2^{nd}$ synchronization-signal extraction means 23.

The $2^{nd}$ synchronization-signal 33 is sent to the input circuit 22, the conversion-processing means 24, the undesired-signal extraction means 25, the original signal regeneration means 26, and the output circuit 27.

Based on the extracted synchronization-signal 33, the signal 21 is converted into the internal signal 32 by the input circuit 22, and sent to the conversion-processing means 24.

Furthermore, based on the extracted $2^{nd}$ synchronization-signal 33, the conversion-processing means 24 converts the internal signal containing the singular points 32 from the input circuit 22 into the signal having singular points by the specific signal processing, and sends it to the undesired-signal extraction means 25.

Undesired-signal extraction means 25 extracts an undesired-signal component from the signal having singular points and generates an undesired-signal by the specific inverse signal processing. Generated undesired-signal is sent to the original signal regeneration means 26. Applying operation to the signals containing singular points and the undesired-signals, the original signal regeneration means 26 restores the signals containing singular points except the undesired-signals. Then, applying inverse operation of the inverse singularity function, the original signal regeneration means 26 regenerates the original signals. The output circuit outputs the regenerated signals 29.

FIG. 2 shows an example of the singularity-function that has singular points on the time-axis. The singularity-function illustrated here has three singular points in the time duration of the one period.

The inverse singularity function that is related to the singularity-function by the inverse singularity operation (Here, double integration is applied) is shown in FIG. 3.

FIG. 4 shows the area where the internal signals are converted into the signals containing singular points by using the inverse singularity function, based on the 1$^{st}$ synchronization-signal extracted from the input signals 11.

In this figure, shapes of an ellipse within the synchronous period show the area containing singular points. They are the area of the inverse-singular points that can be converted into the signals having singular points by the specific signal processing. An example of the operation up to converting into the signals containing singular points is explained using mathematical equations.

The following equation (1) expresses the internal signals 17 x(t) that is the output of the input circuit.

$$x(t)=\int_{-\infty}^{\infty} f(\tau)h(t-\tau)\,d\tau \tag{1}$$

Here, ƒ(t) is the input signal including the original signals h(t) is the impulse response of the input circuit 12

Express the singularity-function having specific singular points by g(t).

At this time, the following equation (2) can express the inverse singularity function s(t) related to this function by the inverse operation R(g).

$$s(t)=R\{g(t)\} \tag{2}$$

FIG. 3 shows the example of which the double integration was applied as the inverse operation, and the equation (2) is given by the following equation (3).

$$s(t)=\iint g(t)dt \tag{3}$$

Consider equation (4) as an example of the singularity-function g(t) shown in FIG. 2.

$$g(t)=(-2\alpha t^2+3)\times(-2\alpha)^2 t\times e^{(-\alpha t^2)};\ \alpha>0 \tag{4}$$

By applying the inverse operation to the g(t) in the equation (4), the inverse singularity function s(t) becomes equation (5) and the wave form is shown in the FIG. 3.

$$s(t)=(-2\alpha)t\times e^{(-\alpha t^2)};\ \alpha>0 \tag{5}$$

Applying the following operation to the digital signal x(t) given by the equation (1) and the inverse singularity function s(t), the signals containing singular points u(t) can be calculated as the following equation (6).

$$u(t)=\int_{-\infty}^{\infty}\{x(t-\tau)s(\tau)\}\,d\tau \tag{6}$$

Here, put T as the sampling length of the digital signal, and define t=nT and τ=mT. Substitute u(n) for u(t), x(n-m) for x(t-τ), and s(m) for s(τ) in discrete time domain. Then, the equation (6) can be expressed as the following equation (7) in discrete time domain.

$$u(n)=\sum_{-M}^{M}\{x(n-m)s(m)\} \tag{7}$$

FIG. 5 shows an example of configuration of the digital circuit realized by equation (7).

Here, square □ shows the delay line of T sec. Triangle ∇ is weighting factor of the signal determined by the impulse response s(m).

Next, a method to find the inverse singularity-function s(t) by the operation processing on a frequency axis is shown.

Apply the Laplace transform to the signal function ƒ(t), h(t) and x(t) in the equation (1).

At this time, the equation (8) can express the digital signal X(s).

$$X(s)=H(s)F(s) \tag{8}$$

Here, the Laplace transforms of the function ƒ(t), h(t) and x(t) are F(s), H(s), and X(s), respectively.

Express the singularity-function g(t) and the inverse singularity-function s(t) in the equation (2) by G(s) and S(s), respectively and consider R(s) as the inverse operation processing.

Then, the equation 2 can be expressed by the following equation (9).

$$S(s)=R(s)G(s) \tag{9}$$

When R(s) is n$^{th}$ order integration, R(s) is given by equation (10) and when R(s) is n$^{th}$ order differential, R(s) is given by equation (11).

$$R(s)=\frac{1}{s^n} \tag{10}$$

$$R(s)=s^n \tag{11}$$

Express the digital signal X(s) by the transfer function Q(s) that converts into the signal containing singular points, then, equation (12) can be got.

$$S(s)=Q(s)H(s)F(s) \tag{12}$$

Therefore, Q(s) is given by the following equation (13).

$$Q(s)=\frac{S(s)}{X(s)} \tag{13}$$

In the conversion means, by converting the transfer function Q(s) given by the equation (13) into the angular frequency function and realizing it by the analog filter or the digital filter, the conversion means can be established.

FIG. 6-A shows the configuration of the original signal converter 40 of the signal processing-system concerning to 2$^{nd}$ viewpoint of this invention. Its original signal converter consists of the signal conversion means 44, the $1^{st}$ synchronization-signal extraction means 13, the input circuit 12, and the output circuit 15.

In the original signal converter 40, the $1^{st}$ synchronization-signal 16 of the original signal is extracted from the signals containing the original signals by the $1^{st}$ synchronization-signal extraction means 13. The $1^{st}$ synchronization-signal 16 is sent to the input circuit 12, the signal conversion means 44, and the output circuit 45. Based on the extracted $1^{st}$ synchronization-signal 16, the original signal 10 is converted into the internal signal 17 and sent to the signal conversion means 44. Based on the extracted $1^{st}$ synchronization-signal and using the inverse-quasi-singularity-function, the signal conversion means 44 converts the internal signal 17 into the signal containing quasi-singular points and sends it to the output circuit 45. Here, the inverse-quasi-singularity-function is given by an inverse operation of the quasi-singularity-function, which is given by dividing the singularity-function having specific singular points. The output circuit 45 outputs the signals containing quasi-singular points received from the signal conversion means 44.

FIG. 6-B shows the configuration of the original signal regenerator 50 of the signal processing-system concerning to $2^{nd}$ viewpoint of this invention. The original signal regenerator 50 consists of the conversion-processing means 54, the undesired-signal extraction means 55, the original signal regeneration means 56, the $2^{nd}$ synchronization-signal extraction means 23, the input circuit 52, and the output circuit 27.

In the original signal regenerator 50, the $2^{nd}$ synchronization-signal extraction-means 23 extracts the $2^{nd}$ synchronization-signal from the inputted signal that contains singular points 51. The $2^{nd}$ synchronization-signal is sent to the following circuits: The input circuit 52, the conversion-processing means 54, the undesired-signal extraction means 55, the original signal regeneration means 56, and the output circuit 27.

Based on the extracted $2^{nd}$ synchronization-signal 57, the input circuit 12 converts the input signals 51 into the internal signals 57 and sends them to the conversion-processing means 54. Then, based on the extracted $2^{nd}$ synchronization-signal, the conversion-processing means 54 converts the signals containing quasi-singular points 57, that come from the input circuit 52, into the signals having singular points by the specific signal processing, and sends them to the undesired-signal extraction means 55. The undesired-signal extraction means 55 extracts undesired-signal component from signals having singular points and generates undesired-signals by the specific inverse signal processing. The generated undesired-signals are sent to the original signal regeneration means 56. Applying operation to the signals containing singular points and the undesired-signals, the original signal regeneration means restores the signals containing quasi-singular points except the undesired-signals. Then, applying inverse operation processing of inverse singularity function, the original signal regeneration means regenerates the original signals. The output circuit outputs the regenerated signals 29.

Explanation of the operation of the signal processing containing singular points is deleted here, since it is the same as the $1^{st}$ viewpoint of this invention. Here, by using quasi-singularity-function that is the divided singularity-function, an example of the conversion operation to the inverse-quasi-singularity signal by applying the inverse operation of the quasi-singularity-function is explained using mathematical expression as following. Express the singularity-function having specific singular points by g(t), express the Laplace transform of this function by $G(s)=G_1(s)G_2(s)$, and separate G(s) into $G_1(s)$ and $G_2(s)$. Express the inverse Laplace transforms of $G_1(s)$ and $G_2(s)$ by $g_1(t)$ and $g_2(t)$, respectively. Here, $g_1(t)$ and $g_2(t)$ are called the quasi-singularity-function. (The same applies hereinafter.) Applying inverse operation R(g), the inverse quasi-singularity-function $s_1(t)$ is given by equation (14).

$$s_1(t)=R\{g_1(t)\} \tag{14}$$

Applying following operation to digital signal x(t) and singularity-function $s_1(t)$, the following equation (15) can express the signal containing singular points $u_1(t)$.

$$u_1(t)=\int_{-\infty}^{\infty}\{x(t-\tau)s_1(\tau)\}\,d\tau \tag{15}$$

Here, put T as the sampling length of the digital signal, and define t=nT and τ=mT. Substitute $u_1(n)$ for $u_1(t)$, x(n-m) for x(t-τ), and for $s_1(\tau)$ in discrete time domain. Then, the equation (15) can be expressed as the following equation (16) in the discrete domain.

$$u_1(n)=\sum_{-M}^{M}\{x(n-m)s_1(m)\} \tag{16}$$

The digital circuit (FIG. 5) concerning the $1^{st}$ viewpoint of this invention can be realized by using the equation 16.

FIG. 7 shows the configuration of the original signal converter 60 and the original signal regenerator 70, that are the signal processing-system concerning to $3^{rd}$ viewpoint of this invention. From the original signal converter 60, the signals containing singular points and the synchronization-signal are sent to the original signal regenerator 70 directly. It is also possible to unify the signal conversion means 64 of the original signal converter 60 and the conversion-processing means 71 of the original signal regenerator 70 and to process a singular point.

FIG. 8 shows the configuration of the original signal converter 80 of the signal processing-system concerning to $4^{th}$ viewpoint of this invention. The original signal converter consists of the signal conversion means 14, the $1^{st}$ synchronization-signal extraction means 13, the inverse singularity-function generation means 81, the error detection means 82, the correction means 83, the input circuit 12, and the input circuit 15.

Explanation of the operation to convert into the signals containing singular points is deleted here, since it is the same as the $1^{st}$ viewpoint of this invention.

Here, an example of operation of the singularity-function generation means 81, the error detection means 82, and the correction means 83 is explained using mathematical expression as following.

In the original signal converter 80 concerning to $4^{th}$ viewpoint of this invention, the error detection means 82 detects the difference between the singularity signal u(t) and singularity-function g(t) having specific singular points and its result is output as the error signal 84. Here, the singularity signal u(t) is given by a specific signal processing of the signals containing singular points that are converted by the signal conversion means 14. And the singularity function g(t) having specific singular points is generated in the singularity-function generation means 81.

Express the error signal by r(t) and apply the Laplace transform to u(t), g(t), and r(t).

Express the Laplace transform of u(t), g(t), and r(t) by U(s), G(s), and R(s), respectively. Then, the error signal R(s) is given by equation (17).

$$R(s) = \frac{G(s)}{U(s)} \tag{17}$$

Error detection means 82 performs the inverse Laplace transform of this error function R(s), and obtains the error signal r(t). Applying inverse signal processing to this error signal, the error detection means 82 generates the correction error signal r'(t) and sends it to the correction means 83.

Here, put T as the sampling length of the digital signal and define t=nT. Then, the corrected signal u(n) can be expressed as the following equation (18) in the discrete domain.

$$u(n) = \sum_{-M}^{M} \{u(n-m)r(m)\} \tag{18}$$

The digital circuit (FIG. 5) concerning the $1^{st}$ viewpoint of this invention can be realized by using the equation 18.

In the signal processing-system concerning the $3^{rd}$ viewpoint of this invention, the error correction function is generated from the difference between the signals having the singular points obtained by the specific signal processing of the signals containing singular points and the singularity-function g(t) having specific singular point. However, in addition to this method, the error correction function can be generated from the difference between the signals u'(t) having specific singular points and the inverse singularity function g'(t) having specific singular points. In this case, the error detection means 82 operates as follows:

The difference between the singularity signal u(t) containing singular points converted by the signal conversion means and the specific inverse singularity function g'(t) containing singular points is defined as the error correction function r'(t), and apply the Laplace transform to u'(t), g'(t), and r'(t). Express the Laplace transform of u'(t), g'(t), and r'(t) by F'(s), G'(s), and R'(s), respectively.

Then, the error function R'(s) can be expressed as following equation 19.

$$R'(s) = \frac{G'(s)}{F'(s)} \tag{19}$$

Error detection means 82 carries out the inverse Laplace transform of this correction function R'(s) and obtains correction signal r'(t), and sends it to the correction means 83.

Here, put T as the sampling length of the digital signal and define t=nT. Then, the corrected signal u'(n) can be expressed as the equation (18) in the discrete domain.

This figure shows the configuration of the original signal conversion means 92 and the polarity reversing function 91, that are a part of the original signal converter 90 of the signal processing-system concerning to $5^{th}$ viewpoint of this invention consists. Furthermore, the polarity reversing function 91 consists of the code-sequence generation means 93, the code synchronization-signal generation means 94, and the $3^{rd}$ synchronization-signal generation means 95.

Internal signal 17 from input circuit and the $1^{st}$ synchronization-signal 16 extracted by the $1^{st}$ synchronization-signal extraction means are input to the polarity reversing function 91. (Here, the $1^{st}$ synchronization-signal extraction means is not shown in FIG. 9-A.)

Based on the $1^{st}$ synchronization-signal 16, the code synchronization-signal generation means 94 generates code synchronization-signal corresponding to the code-sequence length.

Moreover, based on the $1^{st}$ synchronization-signal 16 the $3^{rd}$ synchronization-signal generation means 95 generates the $3^{rd}$ synchronization-signal 96 accelerated at the predetermined rate.

Based on the code synchronization-signal and $3^{rd}$ synchronization-signal, the code-sequence generation means 93 inserts the code that generates orthogonal singular points within the code or among the code-sequence.

FIG. 10 shows the signal (orthogonal singular point) generated in the code-sequence generation means 93 of which polarity between the code-sequence was reversed. The $3^{rd}$ synchronization-signal 96 is supplied to the signal conversion means 92 that generates signals containing singular points.

FIG. 9-B shows the configuration of the original signal regenerator 100 of the signal processing-system concerning to $5^{th}$ viewpoint of this invention. It consists of the $2^{nd}$ synchronization-signal generation means 103, the $4^{th}$ synchronization-signal generation means 105, the code synchronization-signal generation means 104, the conversion-processing means 106, the undesired-signal extraction means 107, the code-sequence signal regeneration means 108, the input circuit 102, and the output circuit 27.

In the original signal regenerator 100, the $4^{th}$ synchronization-signal 115 is extracted from the input signal containing singular points 101 by the $4^{th}$ synchronization-signal extraction means 105. The $4^{th}$ synchronization-signal 115 is supplied to the input circuit 102, the conversion-processing means 106, undesired-signal extraction means 107, the code-sequence signal regeneration means 108, the code synchronization-signal generation means 104, the $2^{nd}$ synchronization-signal generation means 103, and the output circuit 27. On the other hand, the input signal 101 containing singular points are converted into the internal signal 112 by the input circuit 102 based on the $4^{th}$ extracted synchronization-signal 115 and it is sent to the conversion-processing means 106 and the code synchronization-signal generation means 104. Based on the $4^{th}$ extracted synchronization-signal 115, the internal signal 112 containing singular points from the input circuit 102 is converted into the signals having singular points by the specific signal processing and it is sent to the undesired-signal extraction means 107.

The undesired-signal extraction means 107 detects the singular points from the signals containing singular points that are sent from the conversion-processing means 106, detects the orthogonal singular points based on the code synchronization-signal 114 received from the code synchronization-signal generation means 104, extracts the undesired-signal component, and generates undesired-signal by the specific inverse signal processing.

The generated undesired-signal is sent to the code-sequence signal-regeneration means 108. The code-sequence signal regeneration means restores the signals containing singular points except the undesired-signal by operation of the signals containing singular points and the undesired-signals, regenerates the short code signal by the inverse operation processing, and regenerates the original signals from the regenerated short code by using the $4^{th}$ extracted synchronization-signal 115 and the $2^{nd}$ synchronization-signal.

The output circuit 27 outputs the regenerated original signal.

FIG. 11-A shows the configuration of the code processing function within the code 121 in the original signal converter of the signal processing-system concerning to $6^{th}$ viewpoint of this invention. It consists of the short code conversion means 122, the short signal conversion means 123, and the short synchronization-signal generation means 124. Based on the synchronization-signal 18 that inputted into the code processing function within code 121, the short synchronization-signal generation means 124 generates the short synchronization-signal by predetermined rate corresponding to the code length in the code. This short synchronization-signal is supplied to the short code conversion means 122 and the short signal conversion means 123. Based on the short synchronization-signal 125, the short signal conversion means 123 generates specific short codes, and by applying the operation processing to the internal signal 17, it generates the short internal signals of which the time length is shorter than the original signal. The generated short internal signals are sent to the short signal conversion means 123. Based on the short synchronization-signal, the signal conversion means 123 converts the short internal signals into the signals having singular points 129.

FIG. 11-B shows the configuration of the original signal regenerator 130 of the signal processing-system concerning to $6^{th}$ viewpoint of this invention. It consists of the $2^{nd}$ synchronization-signal generation means 134, the short synchronization-signal extraction means 133, the short conversion-processing means 135, the undesired-signal extraction means 136, the short signal regeneration means 137, the original signal regeneration means 138, the input circuit 132, and the output circuit 25. The original signal regenerator 130 extracts the short synchronization-signal 143 that was extracted from the signals containing the singular points 131 received from the original signal regenerator by the short synchronization-signal extraction means 133. The extracted signal is sent to the input circuit 132, the short conversion-processing means 135, the undesired-signal extraction means 136, the short signal regeneration means 137, the original signal regeneration means 138, and the output circuit 25. On the other hand, based on the extracted short synchronization-signal 143, the signals containing singular points 131 are converted into the short internal signals 142 by the input circuit 132, and are sent to the short conversion-processing means 135.

Furthermore, based on the extracted short synchronization-signal 143, the short conversion-processing means 135 carries out the specific signal processing for the short internal signals containing singular points from the input circuit 132 and converts it to the signals having singular points. The converted signal is sent to the undesired-signal extraction means 136.

The undesired-signal extraction means 136 detects the singular points from the signals having singular points, extracts undesired-signal components, and generates undesired-signals by specific inverse signal processing. The generated undesired-signals are sent to the short signal regeneration means 137. The short signal regeneration means restores the signals containing the singular points except the undesired-signals by the operation of the signals containing singular points and the undesired-signals, and regenerates the signals having singular points 129 by the inverse operation. Furthermore, by using $2^{nd}$ synchronization-signal 144, it regenerates the original signals from the regenerated signals having singular points. The output circuit 27 outputs this regenerated original signal 139.

FIGS. 12 to 14 show above-mentioned signal processing.

FIG. 13 shows the waveform of the short synchronization-signal 125 generated in the short synchronization-signal generation means 124. FIG. 12 shows the short internal signal (that is the output signal of the short code conversion means) composed of the predetermined code-sequence synchronizing with the short synchronization-signal 125. FIG. 14 shows the signal containing short singular point 129 converted by the above-mentioned short signal conversion means 123. This figure also shows an example of the singularity domain containing short singular points and the orthogonal singularity domain of the short conversion codes. In the multiple original signal regenerators, the $1^{st}$ original signal regenerator 152-1 regenerates the original signal 156-1, while its undesired-signal detection means sends the detected undesired-signal 153-1 to the following original signal regenerator 152-2. The next original signal regenerator 152-2 regenerates the original signal 156-2, while its undesired-signal detection means sends the detected undesired-signal 153-2 to the following original signal regenerator 152-3. In this way, multiple original signal regenerators operate.

The system shown in this figure is a signal processing-system using singularity that can regenerate multiple original signals.

FIG. 16 shows the original signal regenerator of the signal processing-system concerning the $9^{th}$ viewpoint of this invention. The undesired wave signal 161 of the undesired-signal detection means of the above-mentioned original signal regenerator is sent to $2^{nd}$ output circuit 162 and outputs the undesired-signal 163. The signal processing-system using singularity shown in FIG. 16 shows the signal processing-system using singularity that has the above-mentioned feature.

FIG. 17 shows a signal processing-system concerning the $10^{th}$ viewpoint of this invention. The input signal 171 sent to the multiple original signal regenerators are divided by the branching circuit 172 and sent to individual original signal regenerators. The first 172-3-1 outputs the first undesired-signal 174-1 and the second original signal regenerator 172-3-2 outputs the first undesired-signal 174-2. Like this way, multiple original signal regenerators output each undesired wave signal. The system shown in this figure is the signal processing-system using singularity characterized by the capability of restoring and outputting at least one or more specific undesired wave signals.

FIG. 18 shows the signal processing-system concerning the $11^{th}$ viewpoint of this invention. The input signal 181 sent to the multiple original signal regenerators is sent to the first original signal regenerator 182-1. While the $1^{st}$ original signal regenerator outputs the $1^{st}$ undesired-signal 183-1, it sends the undesired-signal 183-1 to the $2^{nd}$ original signal regenerator 182-2. In the same way, the $2^{nd}$ original signal regenerator outputs the $2^{nd}$ undesired-signal 183-2, it sends the undesired-signal 183-2 to the $3^{rd}$ original signal regenerator. The system shown in this figure is the signal processing-system using singularity characterized by restoring and outputting at least one or more specific undesired wave signals by outputting an undesired wave signal one by one.

FIG. 19-A shows the configuration of the original signal converter 190 of the signal processing-system concerning the $12^{th}$ viewpoint of this invention. In the original signal converter, the signal conversion means sends the specific singularity-function to the function coding means. The function coding means resolves the specific singularity-function into the composition elements and encodes them. The encoder output 192 sends out the output signal 194.

FIG. 19-B shows the configuration of the original signal regenerator 195 of the signal processing-system concerning the $12^{th}$ viewpoint of this invention. The function-coding signal 196 that was inputted into the coding input circuit of the original signal regenerator 195 are converted into the internal coding signals that are suitable for internal coding processing and the internal coding signal is sent to the singularity-function generation means 198. The singularity-function generation means generates the singularity-function from the function-coding signal sent from the coding input circuit and sends it to the original signal regeneration means 26. The original signal regeneration means detects the signals except for the original signal using above-mentioned singularity-function, and regenerates the original signal. The system shown in this figure is the signal processing-system using singularity characterized by above-mentioned original signal regeneration method.

FIG. 20 shows the configuration of the noise generation means 201 and the noise combiner 202 equipped in the signal processing-system concerning the $13^{th}$ viewpoint of this invention. The noise signal generating method is realizable with following means: Method of generating a quasi-random signal by using signal processing operation, method of using thermal noise generated from a resistive element, method of referring a preliminarily measured noise data, etc. FIG. 21-A shows the original signal conversion feature 210 of the signal processing-system concerning the $14^{th}$ viewpoint of this invention, and realizes program execution by the step shown below.

Step 1: The input step 212 that receives the signal from the input means 211.

Step 2: The synchronization-signal extraction step 213 that extracts the synchronization-signal from the received signal from the input step 212.

Step 3: The inverse singularity function generation step 214 that generates the specific inverse singularity function based on the synchronization-signal.

Step 4: The signal conversion step 215 that converts the signal 222 from the input step into the specific signal containing singular points.

Step 5: Output step 216 that sends the signal containing singular points 226 to the output means 217.

In case of the signal processing-system that has the original signal converter concerning the $15^{th}$ viewpoint of this invention, although the above-mentioned step is the same, the singular point is read as a quasi-singular point.

FIG. 21-B shows the original signal regeneration feature 230 of the signal processing-system concerning the $14^{th}$ viewpoint of this invention, and realizes program execution by the step shown below.

Step 1: The input step 232 that receives the signal from the input means 231.

Step 2: The synchronization-signal extraction step 233 that extracts the synchronization-signal 243 from the received signal from the input step 232.

Step 3: The conversion processing step 234 that converts the signal having specific singular points based on the synchronization-signal 243.

Step 4: The undesired-signal extraction step 235 that detects the undesired-signal component from the specific singular point and regenerates the undesired wave by the inverse singularity processing.

Step 5: The original signal regeneration step 236 that eliminates the undesired-signal component from the internal signal 242 from the input step 232 and regenerates the original signal.

Step 6: The output step 237 that sends the regenerated original signal to the output means 238.

In case of the signal processing-system that has the original signal regenerator concerning the $15^{th}$ viewpoint of this invention, although the above-mentioned step is the same, a singular point is read as a quasi-singular point.

FIG. 22 shows the original signal conversion feature 250 and the original signal regenerator 260 of the signal processing-system concerning the $16^{th}$ viewpoint of this invention, and realizes program execution by the step shown below.

Step 1: The input step 212 that receives the signal from the input means 211.

Step 2: The synchronization-signal extraction step 213 that extracts the synchronization-signal 223 from the received signal from the input step 212.

Step 3 The inverse singularity function generation step 254 that generates the specific inverse singularity function based on the synchronization-signal 223.

Step 4: The signal conversion step 255 that converts the signal 222 from the input step 212 into the specific signal containing singular points.

Step 5: The conversion-processing step 264 that converts into the specific signal having the singular points based on the synchronization-signal 223.

Step 6: The undesired-signal extraction step 265 that detects the undesired-signal components from the specific singular point and regenerates the undesired wave by the inverse singularity processing.

Step 7: The original signal regeneration step 266 that eliminates the undesired-signal component from the signal 22 from the input step 212 and regenerates the original signal.

Step 8: The output step 237 that sends the regenerated original signal 247 to the output means 228.

FIG. 23-A shows the original signal conversion feature 270 of the signal processing-system concerning the $17^{th}$ viewpoint of this invention, and realizes program execution by the step shown below.

Step 1: The $2^{nd}$ synchronization-signal generation step 271 that generates the $2^{nd}$ synchronization-signal 276 by receiving the synchronization-signal 223 from the synchronization-signal extraction step 213.

Step 2: The code synchronization-signal generation step 272 that generates the code synchronization-signal based on the $2^{nd}$ synchronization-signal 276 by receiving the signal 222 from the input step 212.

Step 3: The code-sequence generation step 273 that generates the specific code based on the $2^{nd}$ synchronization-signal 276 and the code synchronization-signal.

Step 4: The signal conversion step 274 that converts the Input signal 222 into the signal containing the specific singular point.

Step 5: Output step 275 that sends the signal containing singular point 279 to the output means.

FIG. 23-B shows the original signal regeneration feature 280 of the signal processing-system concerning the $17^{th}$ viewpoint of this invention, and realizes program execution by the step shown below.

Step 1: The Input step 282 that receives the signal from Input means 281.

Step 2: The synchronization-signal extraction step 283 that extracts the $2^{nd}$ synchronization-signal 293 from the received internal signal 292 from Input step 282.

Step 3: The code synchronization-signal step 288 that generates the code synchronization-signal 298 based on the $2^{nd}$ synchronization-signal 293 and the internal signal 292.

Step 4: The conversion-processing step 284 that converts the signal 292 received from the input step 282 based on the code synchronization-signal 298 and the $2^{nd}$ synchronization-signal 293.

Step 5: The undesired-signal extraction step 285 that detects the undesired-signal component from the specific singular point and regenerates the undesired wave by the inverse singularity processing.

Step 6: The code-sequence regeneration step 286 that eliminates the undesired-signal component from the internal signal 292 received from the input step 282 regenerates the code-sequence signal, and regenerates the original signal based on the synchronization-signal 299 received from the synchronization-signal regeneration step.

Step 7: The output step 238 that sends the regenerated original signal to the output means 287.

FIG. 24-A shows the original signal conversion feature 300 of the signal processing-system concerning the $18^{th}$ viewpoint of this invention, and realizes program execution by the step shown below.

Step 1: The short synchronization-signal generation step 302 that receives the synchronization-signal 223 from the synchronization-signal extraction step and generates the short synchronization-signal 307.

Step 2: The short code conversion step 303 that receives the signal 218 from the input step 212 and converts to the short code based on the short synchronization-signal 307.

Step 3: The short signal conversion step 304 that converts the short code 308 from the short code conversion step into the signals having the specific singular points based on the short synchronization-signal 307.

Step 4: The out step 305 that sends the signal containing singular point 309 to the output means.

FIG. 24-B shows the original signal regeneration feature 310 of the signal processing-system concerning the $18^{th}$ viewpoint of this invention, and realizes program execution by the step shown below.

Step 1: The Input step 312 that receives the signal from the input means 311.

Step 2: The short synchronization-signal extraction step that extracts the short synchronization-signal 323 from the short synchronization-signal 323 received from the input step 312.

Step 3: The synchronization-signal extraction step 318 that extracts the synchronization-signal 328 from the short synchronization-signal 323.

Step 4: The conversion-processing step 314 that converts the signal 322 from the input step 312 into the signal having the specific singular points based on the $2^{nd}$ synchronization-signal 293.

Step 5: The undesired-signal extraction step 315 that extracts the undesired-signal component from the specific singular points and regenerates the undesired wave by the inverse singularity processing.

Step 6: The original signal regeneration step 316 that eliminates the undesired-signal component from the signal 322 from the input step 312, and regenerates the original signal based on the synchronization-signal 328.

Step 7: The output step that sends the regenerated original signal to the output means 228.

FIG. 25-A shows the original signal conversion feature 330 of the signal processing-system concerning the $19^{th}$ viewpoint of this invention, and realizes program execution by the step shown below.

Step 1: The Input step 212 that receives the signal from the input means 211.

Step 2: The synchronization-signal extraction step 213 that extracts the synchronization-signal of the signal from the input step 212.

Step 3: The inverse singularity function generation step 274 that generates the specific inverse singularity function based on the synchronization-signal.

Step 4: The signal conversion step 215 that converts the signal 222 from the input step into the specific signals containing singular points.

Step 5: The output step 216 that sends the signals containing singular points to the $1^{st}$ output means 335.

Step 6: The $2^{nd}$ output step 331 that sends the signal from the inverse singularity function generation step 274 to the $2^{nd}$ output means 332.

FIG. 25-B shows the original signal regeneration feature 310 of the signal processing-system concerning the $18^{th}$ viewpoint of this invention, and realizes program execution by the step shown below.

Step 1: The $1^{st}$ input step 232 that receives the signal from the $1^{st}$ input means 231.

Step 2: The synchronization-signal extraction step 233 that extracts the synchronization-signal 243 from of the signal from the $1^{st}$ input step 232.

Step 3: The $2^{nd}$ input step 343 that receives the code of the specific inverse singularity function from the $2^{nd}$ input means 342.

Step 4: The conversion-processing step that converts to the signal having the specific singular point by using the code 348 from the $2^{nd}$ input step 343.

Step 5: The undesired-signal extraction step 235 that detects the undesired-signal component by using the specific singular point and regenerates the undesired wave by the inverse singularity processing.

Step 6: The original signal regeneration step 236 that deletes the undesired-signal component from the internal signal 229 received from the $1^{st}$ input step 232.

Step 7: The output step 237 that sends the regenerated original signal to the output means 238.

FIG. 26 shows the original signal conversion feature concerning the $20^{th}$ viewpoint of this invention, and realizes program execution by the step shown below.

Step 1: The noise generation step 351 that generates the noise 356 based on the synchronization-signal 223.

Step 2: The combining step 352 that combines the signal from the input step 212 and the noise 356 from the noise generation step.

Moreover, in addition to the signal processing-systems that are claimed from the item 1 to the item 19 by this invention, by using program that is recorded on the information memory medium of this invention the following many applications may be realized:

Signal processing means, signal measurement means, information processing means (e.g. general-purpose computer), signal processing component, signal measurement component, and information processing component.

INDUSTRIAL APPLICABILITY

The signal processing-systems of this invention can realize using signal processing means, information processing means, and information memory medium. As the original signal, it is applicable even to an electric signal, an optical signal, and a sound signal.

Moreover, the signal processing-system of this invention can record the program of original-signal conversion method, the signal generated by the inverse singularity-function generator of this invention, and the digital signals containing singular points, on the information memory media, such as a compact disk, a floppy disk, a hard disk, and semiconductor memory.

EXPLANATIONS OF NUMERALS

10 Original signal converter
11 Input signal containing the original signal
12 Input circuit
13 1$^{st}$ synchronization-signal extraction means
14 Signal conversion means
15 Output circuit
16 1$^{st}$ synchronization-signal
17 Internal signal
18 Signal containing singular point
19 Output signals of the signal containing singular points
20 Original signal regenerator
21 Input signals of the signal containing singular points
22 Input circuit
23 2$^{nd}$ synchronization-signal extraction means
24 Conversion-processing means
25 Undesired-signal extraction means
26 Original signal regeneration means
27 Output circuit
29 Output signals of the regenerated original signals
32 Internal signal of the signals containing singular point
33 2$^{nd}$ synchronization-signal
35 Regenerated undesired-signal
36 Regenerated original signal
40 Original signal converter
44 Signal conversion means
45 Output circuit
48 Signals containing quasi-singular points
49 Output signals of the signal containing quasi-singular points
50 Original signal regenerator
51 Input signals of the signal containing quasi-singular points
52 Input circuit
54 Conversion-processing means
55 Undesired-signal extraction means
56 Original signal regeneration means
57 Internal signals of the signal containing quasi-singular points
58 2$^{nd}$ synchronization-signal
60 Original signal converter
61 Input signals containing the original signals
62 Input circuit
63 Synchronization-signal extraction means
64 Signal conversion means
66 Synchronization-signal
69 Signals containing singular points
70 Original signal regenerator
71 Conversion-processing means
72 Undesired-signal extraction means
73 Original signal regeneration means
74 Output circuit
76 Signals having singular point
77 Undesired-signal
78 Regenerated original signal
79 Output signals of the regenerated original signal
80 Original signal converter
81 Singularity-function generation means
82 Error detection means
83 Correction means
84 Error signal
89 Signals containing singular point
90 Original signal converter
91 Polarity reversing function
92 Signal conversion means
93 Code-sequence generation means
94 Code synchronization-signal generation means
95 3$^{rd}$ synchronization-signal generation means
96 3$^{rd}$ synchronization-signal
99 Signals containing singular points and having orthogonal singular points
100 Original signal regenerator
101 Input signals of the signal containing singular points and having orthogonal singular points
102 Input circuit
103 2$^{nd}$ synchronization signal generation means
104 Short synchronization-signal generation means
105 4$^{th}$ synchronization-signal extraction means
106 Conversion-processing means
107 Undesired-signal extraction means
108 Code-sequence signal regeneration means
112 Internal signal
113 2$^{nd}$ synchronization-signal
114 Code synchronization-signal
115 4$^{th}$ synchronization-signal
121 Code processing function within the code
122 Short code conversion means
123 Short signal conversion means
124 Short synchronization-signal generation means
125 Short synchronization-signal
129 Short signal containing singular point
131 Input signals of the short signals containing singular points
132 Input circuit
133 Short synchronization-signal extraction means
134 2$^{nd}$ synchronization-signal generation means
135 Short conversion-processing means
136 Undesired-signal extraction means
137 Short signal regeneration means
138 Original signal regeneration means
139 Output signals of the regenerated original signals
142 Short internal signals
143 Short synchronization-signals
144 2$^{nd}$ synchronization signal
145 Signals having singular points
150 Multiple original signal regeneration means
151 Signals containing singular points
152-1 1$^{st}$ original signal regenerator
152-2 2$^{nd}$ original signal regenerator
152-N N$^{th}$ original signal regenerator
153-1 1$^{st}$ undesired wave signals
153-2 2$^{nd}$ undesired wave signals
156-1 Output signals of the 1$^{st}$ original signals
156-2 Output signals of the 2$^{nd}$ original signals
156-N Output signals of the N$^{th}$ original signals
161 Undesired wave signals
162 2$^{nd}$ output
163 Output signals of the undesired wave signals
170 Multiple original signal regenerator
171 Input signals of the signal containing singular points
172 Branching circuit
173-1 1$^{st}$ original signal regenerator
173-2 2$^{nd}$ original signal regenerator
173-N N$^{th}$ original signal regenerator
174-1 Output signals of the 1$^{st}$ undesired wave signals
174-2 Output signals of the 2$^{nd}$ undesired wave signals
174-N Output signals of the N$^{th}$ undesired wave signals
180 Multiple original signal regenerator
181 Input signals of the signal containing singular points
182-1 1$^{st}$ original signal regenerator

182-2 $2^{nd}$ original signal regenerator
182-N $N^{th}$ original signal regenerator
183-1 Output signals of the $1^{st}$ undesired wave signals
183-2 Output signals of the $2^{nd}$ undesired wave signals
183-N Output signals of the $N^{th}$ undesired wave signals
190 Original signal converter
191 Function coding means
192 Encoder output
194 Output signals of the encoded signals
195 Original signal regenerator
196 Input signals of the encoder
197 Encoder input
198 Singularity-function generation means
201 Noise generation means
202 Combining means
203 Output of the combined signal
210 Original signal converter
211 Input means
212 Input step
213 Synchronization-signal extraction step
214 Inverse singularity function generation step
215 Signal conversion step
216 Output step
217 Output means
222 Output signals of the input step
223 Synchronization-signal
226 Output signals of the output step
230 Original signal regenerator
231 Input means
232 Input step
233 Synchronization-signal extraction step
234 Conversion-processing step
235 Undesired-signal extraction step
236 Original signal regeneration step
237 Output step
238 Output means
242 Output signals of the input step
243 Synchronization-signal
247 Output signals of the output step
250 Original signal converter
254 Inverse singularity function generation step
255 Signal conversion step
260 Original signal regenerator
264 Conversion-processing step
265 Undesired-signal extraction step
266 Original signal regeneration step
270 Original signal converter
271 $2^{nd}$ synchronization signal extraction step
272 Code synchronization-signal generation step
273 Code-sequence generation step
274 Signal conversion step
275 Output step
276 $2^{nd}$ synchronization-signal
277 Code synchronization-signal
280 Original signal regenerator
281 Input means
282 Input step
283 $2^{nd}$ synchronization-signal extraction step
284 Conversion-processing step
285 Undesired-signal extraction step
286 Original signal regeneration step
287 Output step
288 Code synchronization-signal generation step
289 Synchronization-signal generation step
292 Output signals of the input step
293 $2^{nd}$ synchronization signal
298 Code synchronization-signal
299 Synchronization-signal
300 Original signal converter
302 Short synchronization-signal generation step
303 Short code conversion step
304 Short signal conversion step
305 Output step
307 Short synchronization-signal
308 Short code signals
309 Short signals
310 Original signal regenerator
311 Input means
312 Input step
313 Short synchronization-signal generation step
314 Conversion-processing step
315 Undesired-signal extraction step
316 Original signal regeneration step
317 Output step
318 Synchronization-signal generation step
322 Output signals of the input step
323 Short synchronization-signal
328 Synchronization-signal
330 Original signal converter
331 Output step
332 $2^{nd}$ output means
333 Code of the singularity-function
335 $1^{st}$ output means
340 Original signal regenerator
341 Input of the singularity-function code
342 $2^{nd}$ input means
343 $2^{nd}$ input step
348 Output signals of the $2^{nd}$ input step
351 Noise generation step
352 Combining step
355 Output signals of the combining step
356 Output signals of the noise generation step

What is claimed is:

1. A signal processing-system using singularity, comprising:

an original signal converter comprising, a synchronization-signal extraction means extracting a synchronization-signal of an original signal from an input signal into the original signal converter, an input circuit outputting an internal signal suitable for the internal signal processing, an signal conversion means converting the internal signal into signals containing singular points using a specific function, and a $1^{st}$ output circuit outputting the signals containing the singular points converted by the signal conversion means, and an original signal regenerator comprising, a conversion-processing means converting signals containing singular points into signals having singular points, based on the synchronization-signal, an undesired-signal extraction means extracting undesired-signal components from the signals having singular points, an original signal regeneration means regenerating an original signal from the undesired-signal component and the signals containing singular points, a $2^{nd}$ output circuit outputting the regenerated original signal, wherein the original signal converter converts the original signal included in the input signal into the signals containing singular points by signal processing with the specific function, the converted signal containing singular points for every synchronization-signal, wherein the original signal regenerator converts the input signals containing singular points into the signals having singular points by the specific signal processing, and extracts the undesired-signal components from the signals having singular points and regenerates the undesired-signal by performing the specific inverse operation processing, and carries out the specific operation with the undesired-signal and the signal containing singular points, thus regenerates the original signal.

2. A signal processing-system comprising:

an original signal converter comprising, a $1^{st}$ synchronization-signal extraction means extracting a $1^{st}$ synchronization-signal of an original signal from an input signal into the original signal converter, a $1^{st}$ input circuit outputting an internal signal suitable for the internal signal processing, a signal conversion means converting the internal signal into signals containing singular points using a specific function, and a $1^{st}$ output circuit outputting the signals containing the singular points converted by the signal conversion means; and an original signal regenerator comprising, a $2^{nd}$ synchronization-signal extraction means extracting a synchronization-signal from input signals containing singular points into the original signal regenerator, a $2^{nd}$ input circuit outputting synchronized signals containing singular points to the synchronization-signal, a conversion-processing means converting the signals containing singular points into signals having singular points, an undesired-signal extraction means extracting an undesired-signal component from the signals having singular points, an original signal regeneration means regenerating an original signal from the undesired-signal component and the signals containing singular points, a $2^{nd}$ output circuit outputting the regenerated original signal, wherein the original signal converter converts the original signal included in the input signal into the signals containing singular points by signal processing with the specific function, the converted signal containing singular points for every synchronization-signal, wherein the original signal regenerator converts the input signals containing singular points into the signals having singular points by a specific signal processing, and extracts the undesired-signal component from the signals having singular points and regenerates the undesired-signal by performing a specific inverse operation processing, and regenerates the original signal by a specific operation of the undesired-signal and the signals containing singular points.

3. The signal processing-system as set forth in claim 2, the signal processing-system using singularity, wherein the signal conversion means converts the internal signal incoming from the input circuit into the signals containing quasi-singular points using a specific function, wherein the conversion-processing means converts the signals containing quasi-singular points from the input circuit into the signals having quasi-singular points, wherein the original signal converter converts the original signal included in the input signal into the signals containing quasi-singular points by signal processing with the specific function, the converted signal containing quasi-singular points for every synchronization-signal, wherein the original signal regenerator converts the input signal containing a quasi-singular point into the signals having singular points by the specific operation processing extracting the undesired-signal component from the signals having singular points, and regenerates the undesired-signal by performing the specific inverse operation processing, and carries out the specific operation with the undesired-signal and the signal containing quasi-singular points, thus regenerates the original signal.

4. The signal processing-system as in any one of claims 2-1, further comprising;

an error detection means converting the signals containing singular points (or quasi-singular point) coming from the signal conversion means into the signals having singular points by the specific signal processing and detecting the error of the signals having singular points, a correction means correcting the signal converted from the error signal, which was detected by the signal conversion means and by the error detection means, into the more accurate signals-containing-singular-points, wherein the system converts the signals containing singular points into the signals having singular points by the specific function, and detects error of the converted singular points, and corrects the signals containing singular points by using the detected error signal, and outputs the accurate signals containing singular points for every synchronization-signal, and wherein the original signal regenerator regenerates the original signals from the inputted accurate signals containing singular points.

5. The signal processing-system as in any one of claims 2 and 3, further comprising;

a $3^{rd}$ synchronization-signal generation means generating a $3^{rd}$ synchronization-signal of which the synchronous interval is shortened at a specific rate from the $1^{st}$ synchronization-signal of the output of the synchronization-signal extraction means of the original signal converter, a sequence synchronization-signal generation means generating a sequence synchronization-signal that synchronizes with the code-sequence from the synchronization-signal, a code-sequence generation means reversing a polarity of the internal signal from the input circuit of the original signal converter between the code-sequence based on the sequence synchronization-signal and the $3^{rd}$ synchronization-signal, generating an orthogonal singular point, and creating a code-sequence that adds the predetermined code; and a $4^{th}$ synchronization-signal extraction means extracting a $4^{th}$ synchronization-signal from the signals containing the singular points that is inputted to the original signal regenerator, a $2^{nd}$ synchronization-signal generation means generating a synchronization-signal from the $4^{th}$ synchronization-signal, an input circuit outputting the signals containing singular points that are synchronizing with the $4^{th}$ synchronization-signal, a code synchronization-signal generation means generating a code synchronization-signal from the signals containing the singular points, a conversion-processing means generating the singular points from the signals containing the singular points based on the $4^{th}$ synchronization-signal, an undesired-signal detection means extracting the undesired-signal component from the singular points that are generated by the conversion-processing means and the orthogonal singular points that are synchronized with the code synchronization-signal, an original signal regeneration means regenerating an undesired-signal by a specific inverse operation processing of the undesired-signal component, and regenerating the original signal by the specific operation with this regenerated undesired-signal, wherein original signal converter outputs the signals containing the singular points for every $2^{nd}$ synchronization-signal and the orthogonal singular points for every code synchronization-signal, within the inputted original signal, wherein the original signal regenerator detects the singular points and the orthogonal singular points from the input signals containing singular points, and extracts the undesired-signal from the singular points and the orthogonal singular points, and generates an undesired-signal by the specific inverse operation processing, and regenerates the original signal by the operation of this regenerated undesired-signal and the signals containing singular points.

6. The signal processing-system as in any one of claims 2 and 3, further comprising;

a short synchronization-signal generation means generating the short synchronization-signal with synchronous time length shorter than the $1^{st}$ synchronization-signal based on the $1^{st}$ synchronization-signal, a short code conversion means converting the internal signal into the short internal signal (including orthogonal singular point) by carrying out code conversion by operation with a specific code based on the generated short synchronization-signal by the short synchronization-signal generation means, a short signal conversion means converting the short internal signal into the signals containing short singular points; and a short synchronization-signal extraction means extracting the short synchronization-signal from the signals containing short singular points that are inputted into the original signal regenerator, a $2^{nd}$ synchronization-signal generation means generating the $2^{nd}$ synchronization-signal by using the extracted short synchronization-signal, the input circuit converting the input signal of the original signal regenerator into the short internal signal that synchronizes with the short synchronization-signal based on the short synchronization-signal, a short conversion-processing means generating the signals having short singular points from the short internal signal, based on the short synchronization-signal, an undesired-signal detection means extracting the undesired-signal component, based on the singular points generated by the short conversion-processing means and the short synchronization-signal, regenerating the undesired-signal from the undesired-signal component by the specific inverse operation processing, a short signal regeneration means regenerating the short internal signal converted by the short signal conversion means, through the operation of this undesired-signal and the short synchronization-signal, wherein the original signal converter converts the input signal containing the original signal into the specific short internal signal, based on the short synchronization-signal, and converts the short internal signal into the signal containing short singular points by using the specific function that can convert into the signals containing short singular points through the signal processing, and outputs the signal containing short singular points for every short synchronization-signal, and wherein the original signal regenerator converts the signals containing the inputted short singular points into the signals having short singular points by the specific operation processing, and detects an undesired-signal from the signals having short singular points, and generates an undesired wave by the specific inverse operation processing of the detected undesired wave component, and regenerates the short internal signal by operation of the generated undesired wave and the signals containing short singular points, thus carries out the code conversion of the regenerated short internal signal by the specific inverse operation processing and regenerates the original signal.

7. The signal processing-system as set forth in claim 6 wherein the short code conversion means carries out the code conversion by operation with a combination code of multiple specific codes; and wherein the short singular point regeneration means detects the short singular points for every short synchronization-signal from the code signal that combined the multiple specific codes, wherein the original signal regeneration means carries out the inverse code conversion by the inverse operation processing of the code signal that multiple specific codes combined, and regenerating the original signal, wherein, for the synchronization-signal period, multiple specific codes are chosen one by one, and converts the short signal that is operated with different code for every $1^{st}$ synchronization-signal period, into the signal containing short singular points, the signals containing short singular points having the signal containing short singular points for every short synchronization-signal.

8. The original signal regenerator of the signal processing-system including singular point as in any one of claims 2-1, using singularity, wherein the signal processing-system has multiple original signal regenerators; and wherein in the multiple original signal regenerators, the $1^{st}$ original signal regenerator regenerates the $1^{st}$ original signal, and a undesired-signal detector sends the output signal to the next original signal regenerator, and the following original signal regenerator regenerates the original signal, and the undesired-signal detector sends the output signal to the next original signal regenerator, so that the multiple original signal regenerators regenerate their original signals one by one.

9. The original signal regenerator of the signal processing-system including singular point as set forth in claim 8, using singularity, wherein the undesired-signal detector of the original signal regenerator has the $2^{nd}$ output circuit that outputs the output signal of the undesired-signal detector; and wherein the detected signals are output to the external circuit.

10. The original signal regenerator of the signal processing-system including singular point as set forth in claim 8, using singularity, wherein the signal processing-system equips a branching circuit and the multiple original signal regenerators, the branching circuit located at the input of the multiple original signal regenerators distributing the input signal; and wherein the regenerator converts the input signal including many specific undesired waves into individual undesired-signal containing singular points, wherein a singular point detector detects an individual specific singular point by the capability of handling the individual specific singular point, and regenerates at least one or more specific undesired wave signals.

11. The original signal regenerator of the signal processing-system including singular point as set forth in claim 8, using singularity, wherein the original signal regenerator equips a cascaded multiple original signal regenerators including a first original signal regenerator and a next original signal regenerator, wherein the first original signal regenerator outputs own output signal, and sends an output to an input of the following original signal regenerator, wherein the next original signal regenerator outputs own output signal, and sends the output to the input of the following original signal regenerator and wherein the original signal regenerator converts the signal into the signal containing the specific singular points of the undesired-signal, and detects the undesired wave corresponding to a specific singular point, thus regenerating at least one or more specific undesired wave signals.

12. A signal processing-system as in any one of claims 2 and 3, the signal processing-system having singular points, wherein the signal converter of the original signal converter further comprises a function coding means and a coding output circuit, the function coding means decomposing an operation function, which functionizes the input signal from the signal converter into a specific singularity-function, into a composition element, the coding output circuit outputting the function-coding signal apart from the signals containing singular points;

wherein the original signal regenerator further comprises a coding input circuit and a singularity-function generation means, the coding input circuit inputting the function coding signal, the singularity-function generation means generating the singularity-function from the function-coding signal coming from the coding input circuit; and wherein the original signal converter outputs the function-coding signal that converts the input signal into the specific singularity-function together with the signals containing singular points, wherein the original signal regenerator generates the singular point function from the input signal and the function coding signal that are inputted into the original signal regenerator, and regenerates the original signal by detecting signals other than the original signal by using the singular point function.

13. A signal processing-system as in any one of claims 2 and 3, the signal processing-system having singular points or quasi-singular point, wherein the original signal converter further comprises a noise generation means and a combiner, the noise generation means generating a noise signal, the combiner adding the noise to the signal outputted from the 1$^{st}$ output circuit; and wherein the signal processing-system outputs the signal containing singular points that is compounded with the added noise.

14. A non-transitory computer-readable information memory medium that records program for realizing a signal processing-system-using singularity, the signal processing-system comprising an original signal conversion feature and an original signal regeneration feature the program comprising:

first signal processing steps from an input means to an output means of the original signal conversion feature comprising, an input step for reading in the input signal coming from the input means, a synchronization-signal extraction step for extracting the synchronization-signal from the input signal that is read in by the input step, an inverse singularity-function generation step for generating a specific inverse singularity-function, a signal conversion step for converting the input signal into the signals containing singular points using the specific inverse singularity-function; and second signal processing steps from an input means to an output means of the original signal regeneration feature comprising a conversion processing step for converting the signals containing singular points based on the synchronization-signal, an undesired-signal detection step for detecting the undesired-signal, an original-signal regeneration step for regenerating the original signal, an output step for sending the regenerated signals to the output means, wherein the original signal conversion feature decides the inverse singularity-function that is in the relation of the inverse operation with a singularity-function having specific singular points, and converts the original signal contained in the input signal of the original signal conversion feature into the signals containing singular points by using the inverse singularity-function, this converted signal containing singular points for every synchronization-signal; and wherein the original signal regeneration feature extracts the undesired-signal component from the input signal containing singular points, and generates an undesired-signal by the specific inverse operation processing, regenerates the original signal from the operation of this undesired-signal and the signal containing above-mentioned singular points, and outputs the regenerated original signal.

15. A non-transitory computer-readable information memory medium that records program for realizing a signal processing-system that contains the singular points for every synchronization-signal and has the orthogonal singular points in the area between code-sequences, the signal processing-system comprising an original signal conversion feature and an original signal regeneration feature, the program comprising:

first signal processing steps of the original signal conversion feature comprising, an input step for reading in an incoming signal from the input means, a 1$^{st}$ synchronization-signal extraction step for extracting the synchronization-signal from the incoming signal that is read by the input step, an inverse singularity-function generation step for generating a specific inverse singularity-function, a signal conversion step for converting it into the signals containing singular points by using the specific inverse singularity-function, a code-sequence generation step for generating the code-sequence signal having the orthogonal singular points that are created by adding the predetermined code to the signals containing the singular points converted at the signal conversion step, and an output step for sending the code-sequence signal, which is containing singular points and the orthogonal singular points, to the output means; and second signal processing steps of the original signal regeneration feature further comprising, a $2^{nd}$ synchronization-signal extraction step for extracting the $2^{nd}$ synchronization-signal, an undesired-signal detection step for detecting the undesired-signal, and a code-sequence-signal regeneration step for regenerating the code-sequence signal created at the code-sequence generation step, from the operation of the signals containing singular points, and undesired-signal detected by the undesired-signal detection step, wherein the original signal conversion feature generates the incoming signal that is suitable for the internal signal processing by the input step, and generates the code-sequence signal that adds the predetermined code, and generates the signal having orthogonal singular points between code-sequences or within a code-sequence, and outputs the signals having orthogonal singular points for every sequence synchronization signal; and wherein the original signal regeneration feature converts the original signals containing singular points into the signals having singular points, and detects undesired wave signals except for the original signal from the converted signal having singular points and the orthogonal singular point between code-sequences, and regenerates the original signal from the operation of the detected undesired-signal and the signal containing singular points.

16. A non-transitory computer-readable information memory medium that records program for realizing a signal processing-system-using singularity, the signal processing-system comprising an original signal conversion feature and an original signal regeneration feature, the program comprising:

first signal processing steps from an input means to an output means of the original signal conversion feature comprising, an input step for reading in an input signal coming from the input means, a $1^{st}$ synchronization-signal extraction step for extracting a $1^{st}$ synchronization-signal from the input signal that is read in by the input step, an inverse singularity-function generation step for generating a specific inverse singularity-function, a signal conversion step for converting the input signal into the signals containing singular points using the specific inverse singularity-function, an output step for sending the signals containing singular points, to the output means; and second signal processing steps from an input means to an output means of the original signal regeneration feature comprising, an input step for reading in the input signal coming from the input means, a $2^{nd}$ synchronization-signal extraction step for extracting a $2^{nd}$ synchronization-signal from the input signal that is read in by the input step, a singular point generation step for generating the specific singular point by the specific operation processing, an undesired-signal detection step for detecting the undesired-signal, an original signal regeneration step for regenerating the original signal, an output step for sending the regenerated signals to the output means, wherein the original signal conversion feature decides the inverse singularity-function that is in the relation of the inverse operation with a singularity-function having specific singular points, and converts the original signal contained in the input signal of the original signal conversion feature into the signals containing singular points by using the inverse singularity-function, and outputs this converted signal that contains singular points for every synchronization-signal, wherein the original signal regeneration feature carries out the specific operation processing, and generates singular points from the input signal containing singular points, and extracts an undesired-signal component from the generated singular points, and generates an undesired-signal by the specific inverse operation processing, and regenerates the original signal from the operation of this undesired-signal and the signal containing the singular points, and outputs the regenerated original signal.

17. A non-transitory computer-readable information memory medium that records program for realizing a signal processing-system that contains the singular points and has the orthogonal singular points, the signal processing-system comprising an original signal conversion feature and an original signal regeneration feature as in any one of claim 16 or 14, the program comprising:

first signal processing steps of the original signal conversion feature further comprising a short signal generation step for generating the predetermined short signal including orthogonal singular point, a short signal conversion step for converting the short signal generated by the short code generation step into the signal containing short singular points, an output step for outputting the short signal that is containing the singular points; and second signal processing steps of the original signal regeneration feature further comprising a short singular point generation step for converting the signal into the signal having singular points, a short singular point detection step for detecting s the short singular points, an undesired-signal detection step for detecting the undesired-signal, and an original signal regeneration step for regenerating the original signal, wherein the original signal conversion feature converts the input signal containing the original signal into the specific short signals containing orthogonal singular points based on the short synchronization step, and converts the signal into the signal containing short singular points by operation with the short code signal and specific inverse singularity-function, and outputs the signal having orthogonal singular points for every synchronization signal and the signals containing short singular points contain short singular point for every short synchronization step, and wherein the original signal regeneration feature has the step that detects the undesired-signals other than the short signals, from the short singular points and the orthogonal singular points converted from the short synchronization-signal coming from the input step, and regenerates the short signals by operation of the detected undesired wave component and the short synchronization-signal, and regenerates the original signal by the code conversion that carries out the inverse operation of the regenerated short signal and the specific codes.

18. A non-transitory computer-readable information memory medium that records program for realizing a signal processing-system, the signal processing-system comprising an original signal conversion feature and an original signal regeneration feature as in any one of claims 16 to 15, the program comprising:

first signal processing steps of the original signal converter feature further comprising a noise generation step for generating a noise signal, and a combiner step for adding the noise signal to the outputted signal from the signal conversion step, wherein the original signal conversion feature outputs the signal masked by the noise to which the signal containing a singular point was added, wherein the original signal regeneration feature eliminates the undesired wave including the noise signal added by the original signal conversion feature, and regenerates the masked original signal.

19. A non-transitory computer-readable information memory medium that records program for realizing a signal processing-system, the signal processing-system comprising an original signal conversion feature and an original signal regeneration feature, the program comprising:

first signal processing steps from an input means to an output means of the original signal conversion feature comprising, an input step for reading in an input signal coming from the input means, a $1^{st}$ synchronization-signal extraction step for extracting a $1^{st}$ synchronization-signal from the input signal that is read in by the input step, an inverse singularity-function generation step for generating a specific inverse singularity-function, a signal conversion step for converting the input signal into the signals containing singular points using the specific inverse singularity-function, an output step for sending the signals containing singular points, to the output means a process that outputs a composition element code of a specific inverse singularity-function together with the signal containing singular points; and second signal processing steps from an input means to an output means of the original signal regeneration feature further comprising, an input step for reading in the input signal coming from the input means, a $2^{nd}$ synchronization-signal extraction step for extracting a $2^{nd}$ synchronization-signal from the input signal that is read in by the input step, a singular point generation step for generating the specific singular point by the specific operation processing, an undesired-signal detection step for detecting the undesired-signal, an original signal regeneration step for regenerating the original signal, an output step for sending the regenerated signals to the output means, a composition element input step for inputting the composition element code of the specific inverse singularity-function, a singularity-function generation step for generating the singularity-function having specific singular point from the composition element code of the inverse singularity-function coming from the input step, wherein the original signal conversion feature decides the inverse singularity-function that is in the relation of the inverse operation with a singularity-function having specific singular points, and converts the original signal contained in the input signal of the original signal conversion feature into the signals containing singular points by using the inverse singularity-function, and outputs this converted signal that contains singular points for every synchronization-signal, wherein the original signal regeneration feature carries out the specific operation processing, and generates singular points from the input signal containing singular points, and extracts an undesired-signal component from the generated singular points, and generates an undesired-signal by the specific inverse operation processing, and regenerates the original signal from the operation of this undesired-signal and the signal containing the singular points, and outputs the regenerated original signal, wherein the original signal conversion feature decomposes an operation function, which is a specific singularity-function, into a composition element, and encodes it, and converts it into the composition element code; and wherein the original signal regeneration feature generates the singularity-function from the inputted composition element codes and regenerates the original signal from the generated singularity-function.

* * * * *